US007369665B1

(12) United States Patent
Cheng

(10) Patent No.: US 7,369,665 B1
(45) Date of Patent: May 6, 2008

(54) METHOD AND APPARATUS FOR MIXING SOUND SIGNALS

(75) Inventor: Henry Cheng, Seattle, WA (US)

(73) Assignee: Nintendo Co., Ltd., Kyoto (JP)

( * ) Notice: Subject to any disclaimer, the term of this patent is extended or adjusted under 35 U.S.C. 154(b) by 1083 days.

(21) Appl. No.: 09/643,981

(22) Filed: Aug. 23, 2000

(51) Int. Cl.
*H04B 1/00* (2006.01)

(52) U.S. Cl. .................................................... 381/119

(58) Field of Classification Search ............ 381/61–63, 381/119, 1, 17–23, 307; 463/30, 43; 369/4; 84/604, 655, 662; 700/94
See application file for complete search history.

(56) References Cited

U.S. PATENT DOCUMENTS

| | | | | | |
|---|---|---|---|---|---|
| 4,635,288 | A | * | 1/1987 | Stadius | 381/119 |
| 4,783,812 | A | * | 11/1988 | Kaneoka | 381/61 |
| 5,052,685 | A | | 10/1991 | Lowe et al. | 273/460 |
| 5,138,660 | A | | 8/1992 | Lowe et al. | 381/17 |
| 5,237,619 | A | * | 8/1993 | Frassinetti | 381/119 |
| 5,410,603 | A | | 4/1995 | Ishiguro et al. | 381/61 |
| 5,438,623 | A | | 8/1995 | Begault | 381/17 |
| 5,471,450 | A | | 11/1995 | Yonemitsu et al. | 369/60 |
| 5,471,539 | A | * | 11/1995 | Flum et al. | 381/119 |
| 5,521,981 | A | | 5/1996 | Gehring | 381/17 |
| 5,607,356 | A | | 3/1997 | Schwartz | 463/31 |
| 5,614,685 | A | | 3/1997 | Matsumoto et al. | 84/602 |
| 5,689,080 | A | | 11/1997 | Gulick | 84/604 |
| 5,753,841 | A | | 5/1998 | Hewitt | 84/604 |
| 5,763,801 | A | | 6/1998 | Gulick | 84/604 |
| 5,809,342 | A | | 9/1998 | Gulick | 395/884 |
| 5,822,438 | A | | 10/1998 | Sekine et al. | 381/17 |
| 5,835,944 | A | | 11/1998 | Lahti et al. | 711/118 |
| 5,847,304 | A | | 12/1998 | Hewitt | 84/622 |
| 5,862,231 | A | | 1/1999 | Tokuhisa | 381/61 |
| 5,880,390 | A | | 3/1999 | Hagiwara | 84/630 |
| 5,895,469 | A | | 4/1999 | Lahti et al. | 395/872 |
| 5,896,291 | A | | 4/1999 | Hewitt et al. | 364/400.01 |
| 5,896,459 | A | * | 4/1999 | Williams, Jr. | 381/119 |
| 5,912,976 | A | | 6/1999 | Klayman et al. | 381/18 |
| 5,966,182 | A | | 10/1999 | Yonemitsu et al. | 348/423 |
| 6,007,228 | A | | 12/1999 | Agarwal et al. | 364/400.01 |
| 6,008,446 | A | | 12/1999 | Van Buskirk et al. | 84/603 |
| 6,016,522 | A | | 1/2000 | Rossum | 710/52 |
| 6,047,365 | A | | 4/2000 | Chambers et al. | 711/220 |
| 6,085,309 | A | | 7/2000 | Okamura | 712/34 |
| 6,100,461 | A | | 8/2000 | Hewitt | 84/603 |
| 6,137,043 | A | | 10/2000 | Rossum | 84/603 |
| 6,137,046 | A | | 10/2000 | Kamiya | 84/604 |

(Continued)

FOREIGN PATENT DOCUMENTS

| | | | |
|---|---|---|---|
| EP | 0 637 191 | A2 | 2/1995 |
| EP | 0 684 751 | A1 | 11/1995 |
| GB | 2 224 186 | A | 4/1990 |
| JP | 6-133400 | A | 5/1994 |
| JP | 6-189399 | A | 7/1994 |

(Continued)

*Primary Examiner*—Vivian Chin
*Assistant Examiner*—Lun-See Lao
(74) *Attorney, Agent, or Firm*—Nixon & Vanderhye, PC

(57) ABSTRACT

A system and method for mixing sound signals is provided in which a mixer buffer stores sample values for three or more sound channels, each sound channel including a main sound component and one or more auxiliary sound components. Send paths are provided for sending the auxiliary sound components for each sound channel to a sound effects processor and return paths from the sound effects processor are provided for respectively adding the effects-processed auxiliary sound components for each channel to the corresponding main sound component.

29 Claims, 15 Drawing Sheets

U.S. PATENT DOCUMENTS

| | | | | |
|---|---|---|---|---|
| 6,138,183 | A | 10/2000 | Tien et al. | 710/22 |
| 6,148,439 | A | 11/2000 | Nishiyama | 717/9 |
| 6,195,736 | B1 | 2/2001 | Lisle | 711/206 |
| 6,239,345 | B1 | 5/2001 | Laroche | 84/604 |
| 6,239,810 | B1 * | 5/2001 | Van Hook et al. | 345/420 |
| 6,572,475 | B1 * | 6/2003 | Okabe et al. | 463/30 |
| 6,658,117 | B2 * | 12/2003 | Hasebe | 381/61 |

FOREIGN PATENT DOCUMENTS

| | | | |
|---|---|---|---|
| JP | 406189399 | * | 7/1994 |
| WO | W0 94/24836 | | 10/1994 |
| WO | 94/10641 | | 11/1994 |
| WO | WO 98/42162 | | 9/1998 |

* cited by examiner

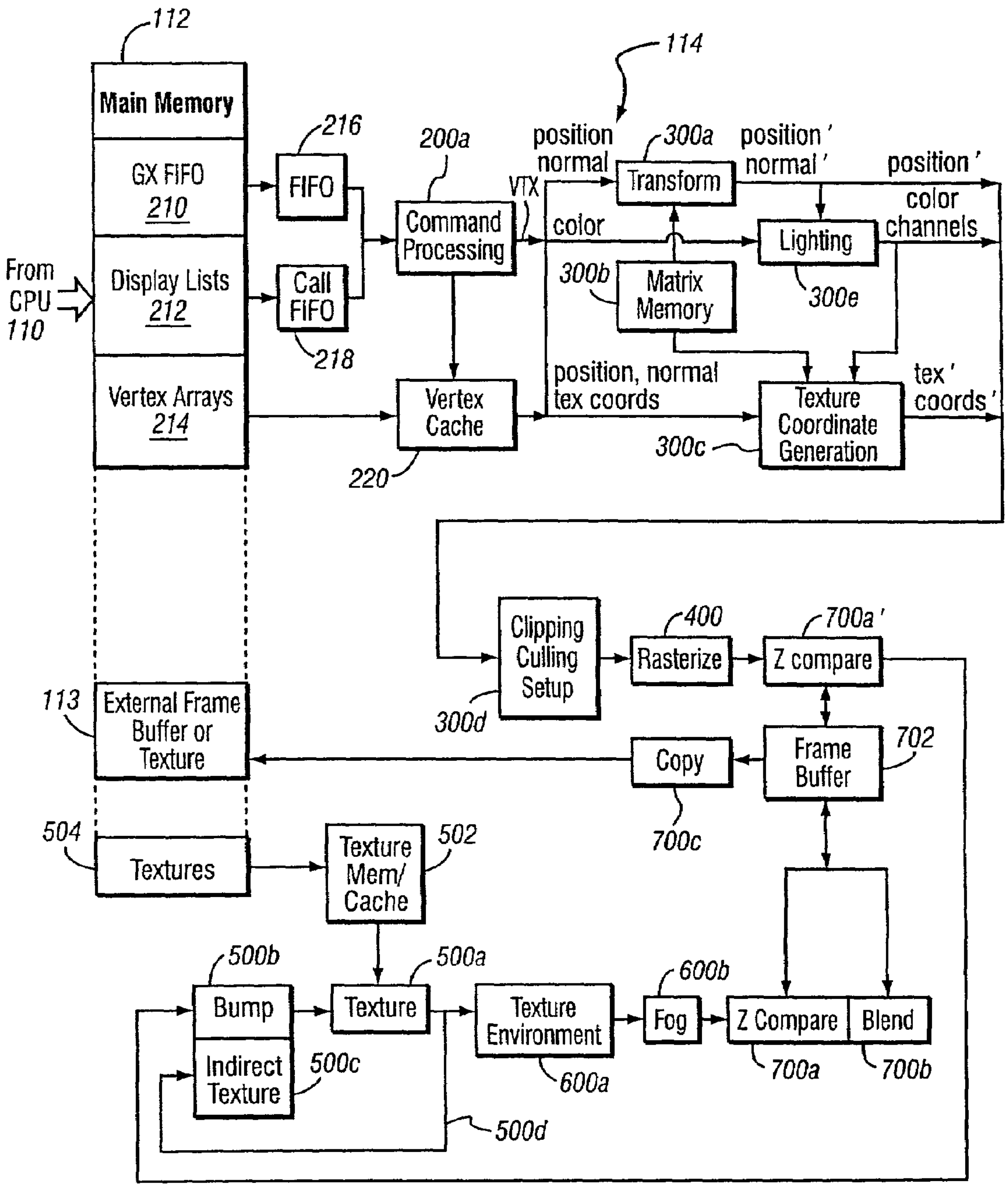
Fig. 5 EXAMPLE GRAPHICS PROCESSOR FLOW

METHOD AND APPARATUS FOR MIXING SOUND SIGNALS

RELATED APPLICATIONS

This application is related to application Ser. No. 09/643,984, now U.S. Pat. No. 6,643,744, entitled "Method and Apparatus for Pre-Fetching Audio Data", the contents of which are hereby incorporated by reference.

FIELD OF THE INVENTION

The present invention relates to mixing sound signals, and more particularly, to mixing sound signals that accompany the video output of interactive graphics systems such as home video game platforms.

BACKGROUND AND SUMMARY OF THE INVENTION

Many of us have seen films containing remarkably realistic dinosaurs, aliens, animated toys and other fanciful creatures. Such animations are made possible by computer graphics. Using such techniques, a computer graphics artist can specify how each object should look and how it should change in appearance over time, and a computer then models the objects and displays them on a display such as your television or a computer screen. The computer takes care of performing the many tasks required to make sure that each part of the displayed image is colored and shaped just right based on the position and orientation of each object in a scene, the direction in which light seems to strike each object, the surface texture of each object, and other factors.

Because computer graphics generation is complex, computer-generated three-dimensional graphics just a few years ago were mostly limited to expensive specialized flight simulators, high-end graphics workstations and supercomputers. The public saw some of the images generated by these computer systems in movies and expensive television advertisements, but most of us couldn't actually interact with the computers doing the graphics generation. All this has changed with the availability of relatively inexpensive 3D graphics platforms such as, for example, the Nintendo 64® and various 3D graphics cards now available for personal computers. It is now possible to interact with exciting 3D animations and simulations on relatively inexpensive computer graphics systems in your home or office.

Interactive 3D computer graphics systems are often used to play video games. The "gaming experience" however typically involves more than just video content. For example, almost all gaming experiences involve audio content that accompanies the video content. The audio system described herein enables sound emitters to be placed in three-dimensional space and provides a powerful means of generating psycho-acoustic 3D sound effects with a pair of speakers. The audio system includes an audio memory that is usable, for example, to store sound samples, instrument wave tables, audio tracks and the like read from a mass storage device such as a DVD. The samples, wave tables, tracks, etc. are subsequently read out and processed by an audio digital signal processor to produce the game audio content. This content is transferred to a main memory from where it is subsequently read out for supply to a decoder and output to speakers. The separate audio memory improves the access for the audio processing circuitry to audio data by avoiding the need to contend with other resources (e.g., the graphics system) attempting to access the main system memory.

The present invention provides enhancements for the audio content of video games and, in particular, enhancements for sound effects such as reverb, chorus and delay. A conventional arrangement for providing sound effects in a stereo sound system is shown in FIG. 11A. The signal from a sound source is distributed to left and right channels L and R. The signals on the left and right channels are tapped and sent to a sound effects processor 1000 for separately providing left- and right-channel sound effects such as reverb, chorus and delay. The processed signals are added back to the left and right channels and the resultant signal is ultimately output via speakers 1002L and 1002R.

FIG. 11B shows a conventional arrangement for providing sound effects in a surround sound system. The signal from a sound source is distributed to left, right and surround channels L, R and S. There is one "auxiliary" send to effects processor 1004 summed from all the channels and one "auxiliary" return from the effects processor 1004 supplied to all the channels. Suppose, for example, that the signal from the sound source is mixed heavily to the left channel and that effects processor 1004 adds some reverb. Because of the arrangement of FIG. 11B, the reverb is centered because it is evenly distributed to all the channels. Thus, it is not possible to selectively position reverb or other effects such as delay and chorus in three-dimensional space using the arrangement of FIG. 11B.

The mixer and effects processor described below separately provide effects for signals on three or more channels such as left, right and surround channels. Therefore, effects may be selectively "positioned" in three-dimensional space. A mixer buffer stores sample values for three or more sound channels, each sound channel including a main sound component and one or more auxiliary sound components. Send paths are provided for sending the auxiliary sound components for each sound channel to the sound effects processor and return paths from the sound effects processor are provided for respectively adding the effects-processed auxiliary sound components for each channel to the corresponding main sound component. The mixer is symmetrical in that the number of channels in the mixer buffer is the same as the number of sends/returns to/from the effects processor.

BRIEF DESCRIPTION OF THE DRAWINGS

These and other features and advantages provided by the invention will be better and more completely understood by referring to the following detailed description of presently preferred embodiments in conjunction with the drawings, of which:

FIG. 5 is an example logical flow diagram of the FIG. 4 graphics and audio processor;

DETAILED DESCRIPTION OF EXAMPLE EMBODIMENTS OF THE INVENTION

Figure 1:
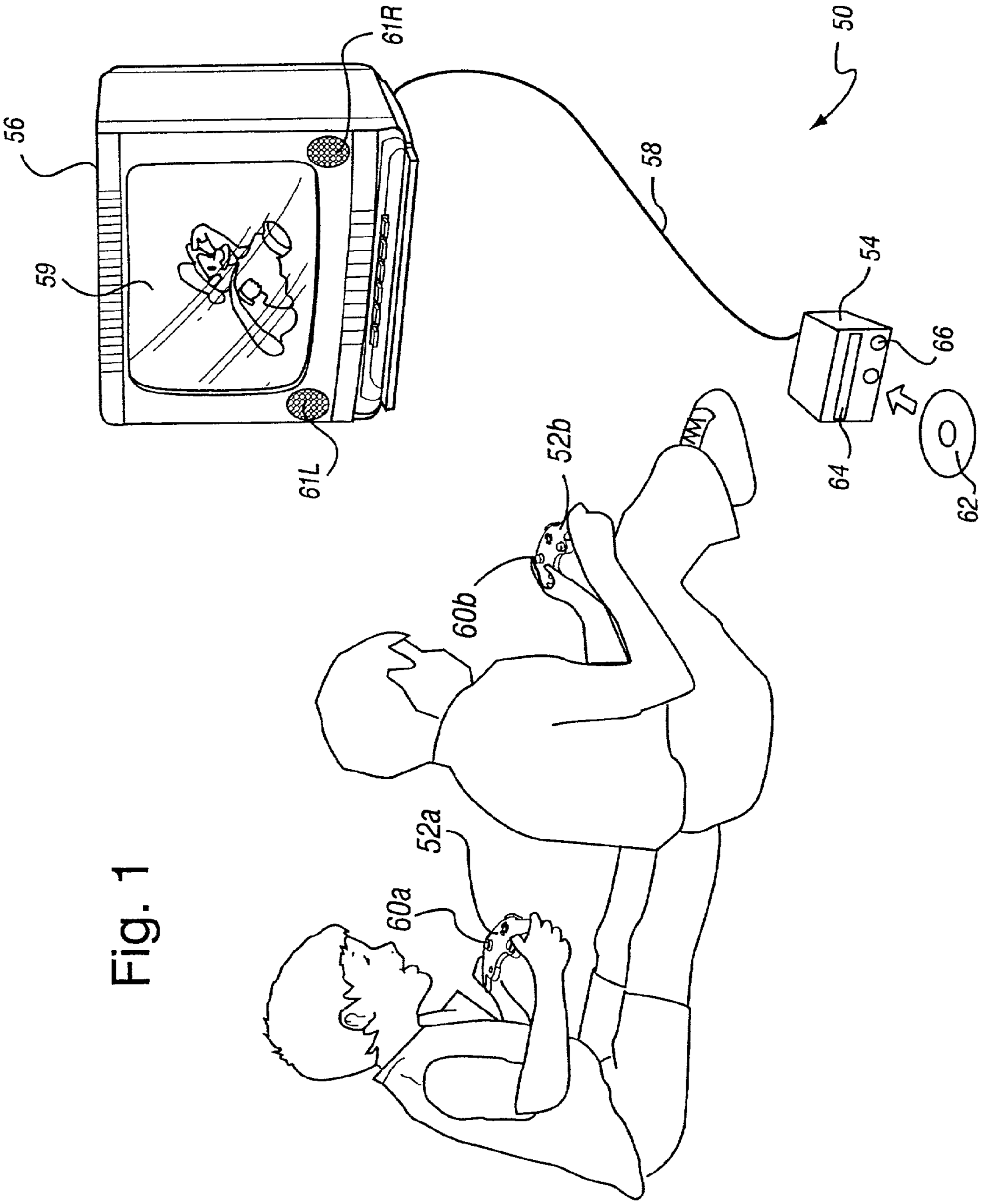
FIG. 1 is an overall view of an example interactive computer graphics system.

FIG. 1 shows an example interactive 3D computer graphics system 50. System 50 can be used to play interactive 3D video games with interesting stereo sound. It can also be used for a variety of other applications.

In this example, system 50 is capable of processing, interactively in real time, a digital representation or model of a three-dimensional world. System 50 can display some or all of the world from any arbitrary viewpoint. For example, system 50 can interactively change the viewpoint in response to real time inputs from handheld controllers 52*a*, 52*b* or other input devices. This allows the game player to see the world through the eyes of someone within or outside of the world. System 50 can be used for applications that do not require real time 3D interactive display (e.g., 2D display generation and/or non-interactive display), but the capability of displaying quality 3D images very quickly can be used to create very realistic and exciting game play or other graphical interactions.

To play a video game or other application using system 50, the user first connects a main unit 54 to his or her color television set 56 or other display device by connecting a cable 58 between the two. Main unit 54 produces both video signals and audio signals for controlling color television set 56. The video signals are what controls the images displayed on the television screen 59, and the audio signals are played back as sound through television stereo loudspeakers 61L, 61R.

The user also needs to connect main unit 54 to a power source. This power source may be a conventional AC adapter (not shown) that plugs into a standard home electrical wall socket and converts the house current into a lower DC voltage signal suitable for powering the main unit 54. Batteries could be used in other implementations.

The user may use hand controllers 52*a*, 52*b* to control main unit 54. Controls 60 can be used, for example, to specify the direction (up or down, left or right, closer or further away) that a character displayed on television 56 should move within a 3D world. Controls 60 also provide input for other applications (e.g., menu selection, pointer/cursor control, etc.). Controllers 52 can take a variety of forms. In this example, controllers 52 shown each include controls 60 such as joysticks, push buttons and/or directional switches. Controllers 52 may be connected to main unit 54 by cables or wirelessly via electromagnetic (e.g., radio or infrared) waves.

To play an application such as a game, the user selects an appropriate storage medium 62 storing the video game or other application he or she wants to play, and inserts that storage medium into a slot 64 in main unit 54. Storage medium 62 may, for example, be a specially encoded and/or encrypted optical and/or magnetic disk. The user may operate a power switch 66 to turn on main unit 54 and cause the main unit to begin running the video game or other application based on the software stored in the storage medium 62. The user may operate controllers 52 to provide inputs to main unit 54. For example, operating a control 60 may cause the game or other application to start. Moving other controls 60 can cause animated characters to move in different directions or change the user's point of view in a 3D world. Depending upon the particular software stored within the storage medium 62, the various controls 60 on the controller 52 can perform different functions at different times.

Example Electronics of Overall System

Figure 2:
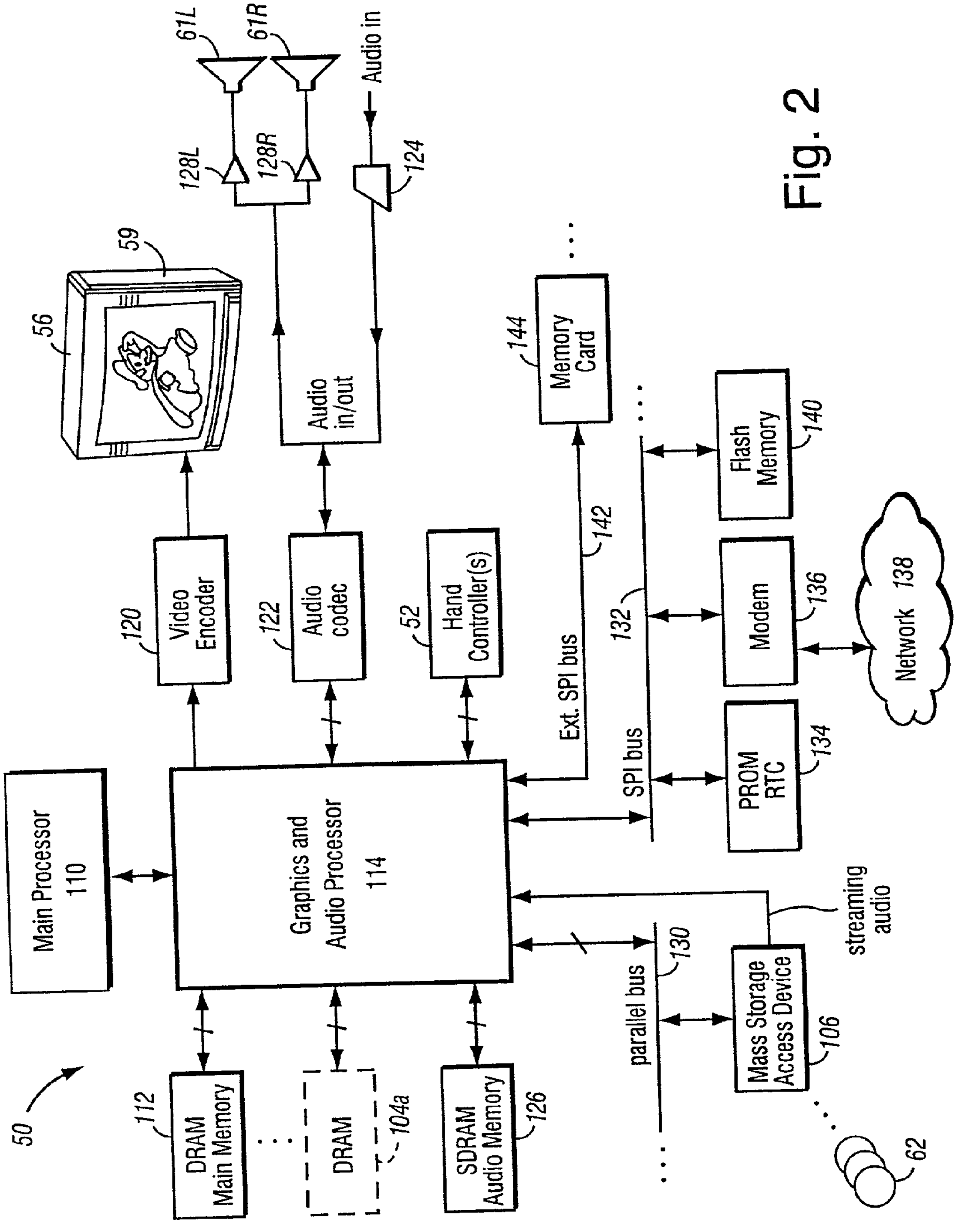
FIG. 2 is a block diagram of the FIG. 1 example computer graphics system.

FIG. 2 shows a block diagram of example components of system 50. The primary components include:

- a main processor (CPU) 110,
- a main memory 112, and
- a graphics and audio processor 114.

In this example, main processor 110 (e.g., an enhanced IBM Power PC 750) receives inputs from handheld controllers 52 (and/or other input devices) via graphics and audio processor 114. Main processor 110 interactively responds to user inputs, and executes a video game or other program supplied, for example, by external storage media 62 via a mass storage access device 106 such as an optical disk drive. As one example, in the context of video game play, main processor 110 can perform collision detection and animation processing in addition to a variety of interactive and control functions. Main memory 112 may, for example, comprise an SRAM, such as a 1TSRAM, manufactured by Mosys Corporation, which automatically performs internal refresh operations.

In this example, main processor 110 generates 3D graphics and audio commands and sends them to graphics and audio processor 114. The graphics and audio processor 114 processes these commands to generate interesting visual images on display 59 and interesting stereo sound on stereo loudspeakers 61R, 61L or other suitable sound-generating devices.

Example system 50 includes a video encoder 120 that receives image signals from graphics and audio processor 114 and converts the image signals into analog and/or digital video signals suitable for display on a standard display device such as a computer monitor or home color television set 56. System 100 also includes an audio codec (compressor/decompressor) 122 that compresses and decompresses digitized audio signals and may also convert between digital and analog audio signaling formats as needed. Audio codec 122 can receive audio inputs via a buffer 124 and provide them to graphics and audio processor 114 for processing (e.g., mixing with other audio signals the processor generates and/or receives via a streaming audio output of mass storage access device 106). Graphics and audio processor 114 in this example can store audio related information in an audio memory 126 that is available for audio tasks. Graphics and audio processor 114 provides the resulting audio output signals to audio codec 122 for decompression and conversion to analog signals (e.g., via buffer amplifiers 128L, 128R) so they can be reproduced by loudspeakers 61L, 61R.

Graphics and audio processor 114 has the ability to communicate with various additional devices that may be present within system 100. For example, a parallel digital bus 130 may be used to communicate with mass storage access device 106 and/or other components. A serial peripheral bus 132 may communicate with a variety of peripheral or other devices including, for example:

- a programmable read-only memory and/or real time clock 134,
- a modem 136 or other networking interface (which may in turn connect system 100 to a telecommunications network 138 such as the Internet or other digital network from/to which program instructions and/or data can be downloaded or uploaded), and flash memory 140.

A further external serial bus 142 may be used to communicate with additional expansion memory 144 (e.g., a memory card) or other devices. Connectors may be used to connect various devices to busses 130, 132, 142.

Example Graphics And Audio Processor

Figure 3:
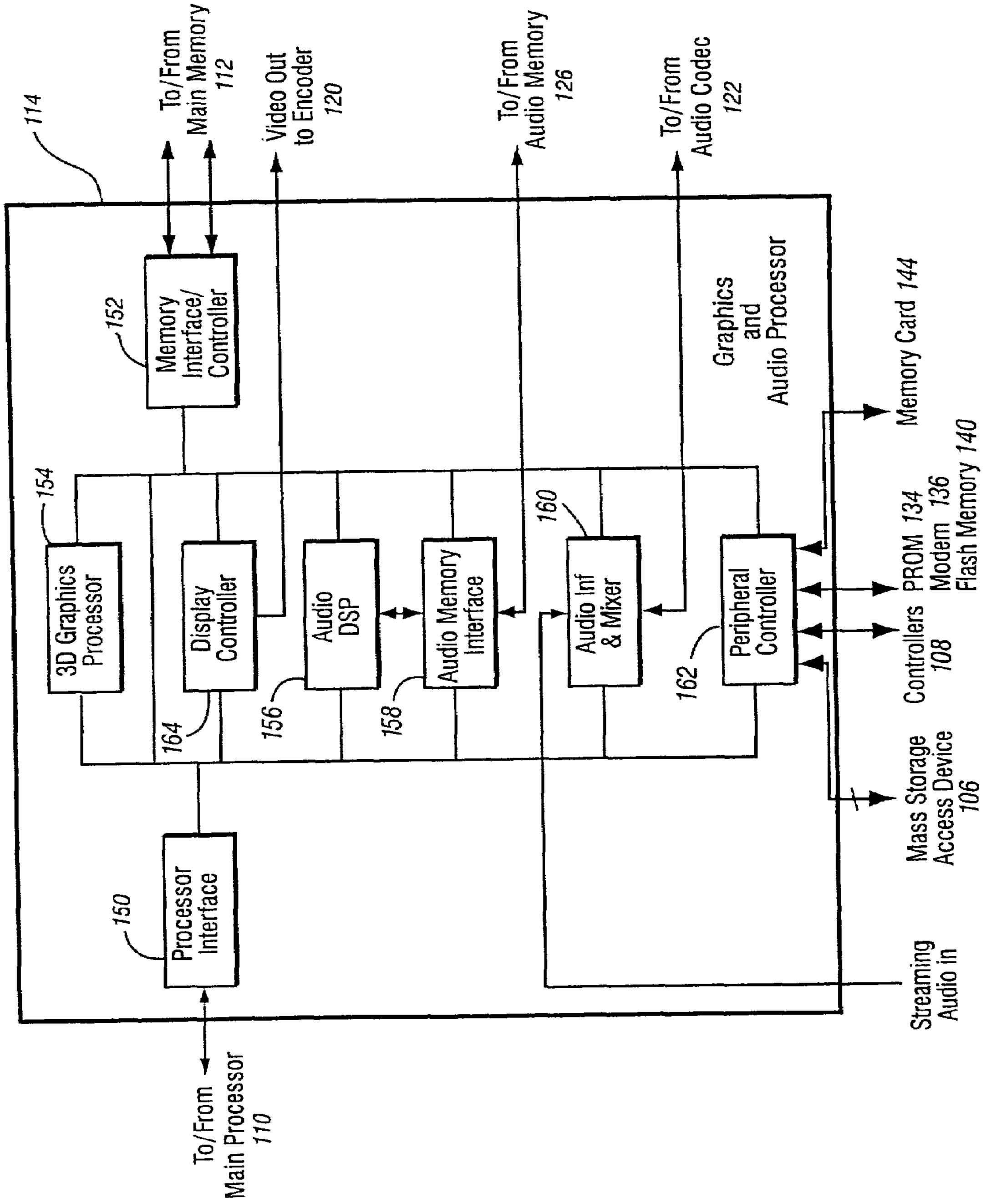
FIG. 3 is a block diagram of the example graphics and audio processor shown in FIG. 2.

FIG. 3 is a block diagram of an example graphics and audio processor 114. Graphics and audio processor 114 in one example may be a single-chip ASIC (application specific integrated circuit). In this example, graphics and audio processor 114 includes:

- a processor interface 150,
- a memory interface/controller 152,
- a 3D graphics processor 154,
- an audio digital signal processor (DSP) 156,
- an audio memory interface 158,
- an audio interface and mixer 160,
- a peripheral controller 162, and
- a display controller 164.

3D graphics processor 154 performs graphics processing tasks. Audio digital signal processor 156 performs audio processing tasks. Display controller 164 accesses image information from main memory 112 and provides it to video encoder 120 for display on display device 102. Audio interface and mixer 160 interfaces with audio codec 122, and can also mix audio from different sources (e.g., streaming audio from mass storage access device 106, the output of audio DSP 156, and external audio input received via audio codec 122). Processor interface 150 provides a data and control interface between main processor 110 and graphics and audio processor 114.

Memory interface 152 provides a data and control interface between graphics and audio processor 114 and memory 112. In this example, main processor 110 accesses main memory 112 via processor interface 150 and memory interface 152 that are part of graphics and audio processor 114. Peripheral controller 162 provides a data and control interface between graphics and audio processor 114 and the various peripherals mentioned above. Audio memory interface 158 provides an interface with audio memory 126.

Example Graphics Pipeline

Figure 4:
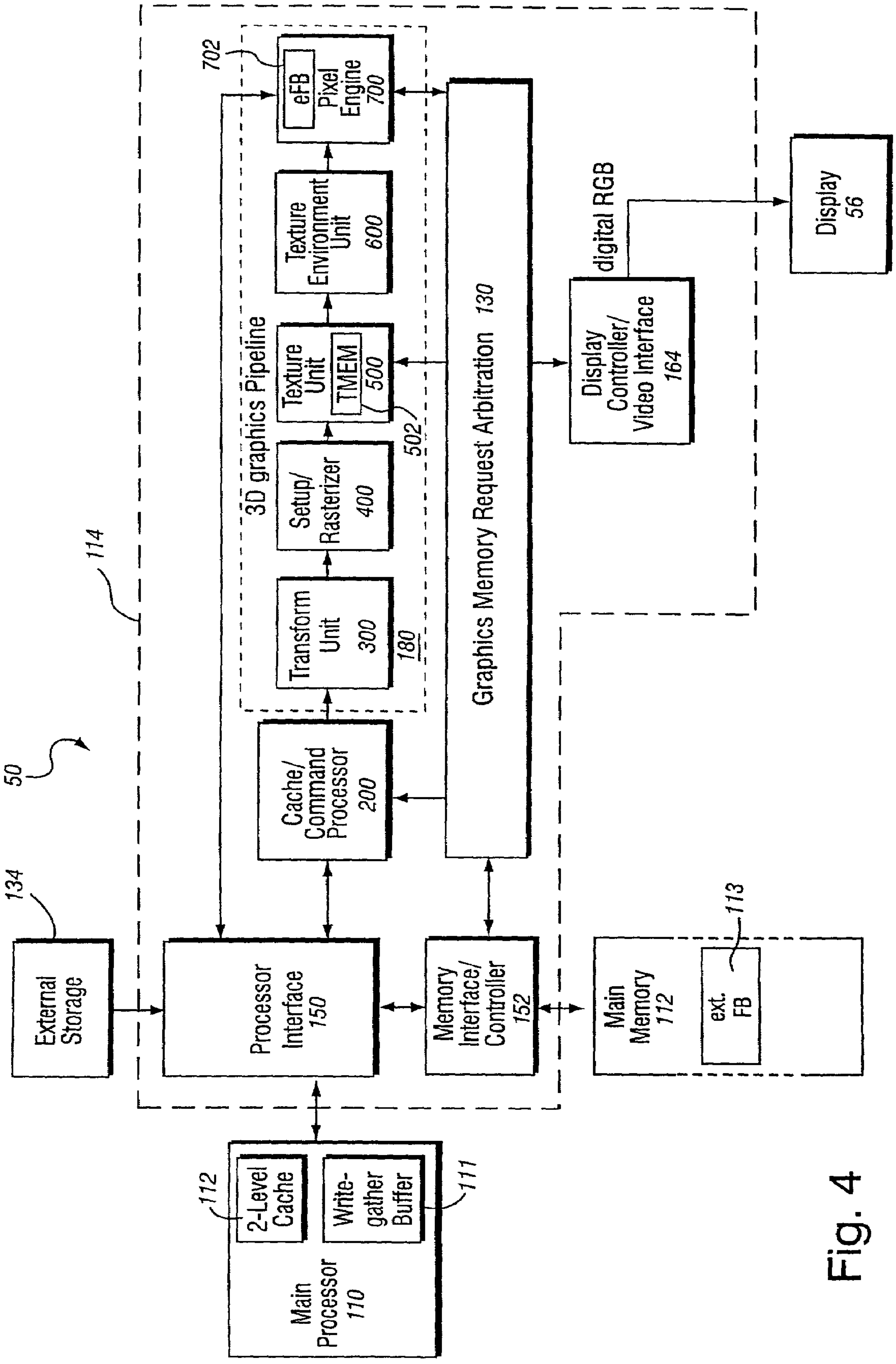
FIG. 4 is a block diagram of the example 3D graphics processor shown in FIG. 3.

FIG. 4 shows a graphics processing system including a more detailed view of an exemplary FIG. 33D graphics processor 154. 3D graphics processor 154 includes, among other things, a command processor 200 and a 3D graphics pipeline 180. Main processor 110 communicates streams of data (e.g., graphics command streams and display lists) to command processor 200. Main processor 110 has a two-level cache 112 to minimize memory latency, and also has a write-gathering buffer 111 for uncached data streams targeted for the graphics and audio processor 114. The write-gathering buffer 111 collects partial cache lines into full cache lines and sends the data out to the graphics and audio processor 114 one cache line at a time for maximum bus usage.

Command processor 200 receives display commands from main processor 110 and parses them—obtaining any additional data necessary to process them from shared memory 112 via memory controller 152. The command processor 200 provides a stream of vertex commands to graphics pipeline 180 for 2D and/or 3D processing and rendering. Graphics pipeline 180 generates images based on these commands. The resulting image information may be transferred to main memory 112 for access by display controller/video interface unit 164—which displays the frame buffer output of pipeline 180 on display 102.

FIG. 5 is a block logical flow diagram portraying illustrative processing performed using graphics processor 154. Main processor 110 may store graphics command streams 210, display lists 212 and vertex arrays 214 in main memory 112, and pass pointers to command processor 200 via processor/bus interface 150. The main processor 110 stores graphics commands in one or more graphics first-in-first-out (FIFO) buffers 210 it allocates in main memory 110. The command processor 200 fetches:

- command streams from main memory 112 via an on-chip FIFO memory buffer 216 that receives and buffers the graphics commands for synchronization/flow control and load balancing,
- display lists 212 from main memory 112 via an on-chip call FIFO memory buffer 218, and
- vertex attributes from the command stream and/or from vertex arrays 1000 in main memory 112 via a vertex cache 220.

Command processor 200 performs command processing operations 200*a* that convert attribute types to floating point format, and pass the resulting complete vertex polygon data to graphics pipeline 180 for rendering/rasterization. A programmable memory arbitration circuitry 130 (see FIG. 4) arbitrates access to shared main memory 112 between graphics pipeline 180, command processor 200 and display controller/video interface unit 164.

FIG. 4 shows that graphics pipeline 180 may include:

- a transform unit 300,
- a setup/rasterizer 400,
- a texture unit 500,
- a texture environment unit 600, and
- a pixel engine 700.

Transform unit 300 performs a variety of 2D and 3D transform and other operations 300*a* (see FIG. 5). Transform unit 300 may include one or more matrix memories 300*b* for storing matrices used in transformation processing 300*a*. Transform unit 300 transforms incoming geometry per vertex from object space to screen space; and transforms incoming texture coordinates and computes projective texture coordinates (300*c*). Transform unit 300 may also perform polygon clipping/culling 300*d*. Lighting processing 300*e* also performed by transform unit 300*b* provides per vertex lighting computations for up to eight independent lights in one example embodiment. Transform unit 300 can also perform texture coordinate generation (300*c*) for embossed type bump mapping effects, as well as polygon clipping/culling operations (300*d*).

Setup/rasterizer 400 includes a setup unit which receives vertex data from transform unit 300 and sends triangle setup information to one or more rasterizer units (400*b*) performing edge rasterization, texture coordinate rasterization and color rasterization.

Texture unit 500 (which may include an on-chip texture memory (TMEM) 502) performs various tasks related to texturing including for example:

- retrieving textures 504 from main memory 112,
- texture processing (500*a*) including, for example, multi-texture handling, post-cache texture decompression, texture filtering, embossing, shadows and lighting through the use of projective textures, and BLIT with alpha transparency and depth, bump map processing for computing texture coordinate displacements for bump mapping, pseudo texture and texture tiling effects (500*b*), and indirect texture processing (500*c*).

Texture unit 500 outputs filtered texture values to the texture environment unit 600 for texture environment processing (600*a*). Texture environment unit 600 blends polygon and texture color/alpha/depth, and can also perform texture fog processing (600*b*) to achieve inverse range based fog effects. Texture environment unit 600 can provide multiple stages to perform a variety of other interesting environment-related functions based for example on color/alpha modulation, embossing, detail texturing, texture swapping, clamping, and depth blending.

Pixel engine 700 performs depth (z) compare (700*a*) and pixel blending (700*b*). In this example, pixel engine 700 stores data into an embedded (on-chip) frame buffer memory 702. Graphics pipeline 180 may include one or more embedded DRAM memories 702 to store frame buffer and/or texture information locally. Z compares 700*a*' can also be performed at an earlier stage in the graphics pipeline 180 depending on the rendering mode currently in effect (e.g., z compares can be performed earlier if alpha blending is not required). The pixel engine 700 includes a copy operation 700*c* that periodically writes on-chip frame buffer 702 to main memory 112 for access by display/video interface unit 164. This copy operation 700*c* can also be used to copy embedded frame buffer 702 contents to textures in the main memory 112 for dynamic texture synthesis effects. Anti-aliasing and other filtering can be performed during the copy-out operation. The frame buffer output of graphics pipeline 180 (which is ultimately stored in main memory 112) is read each frame by display/video interface unit 164. Display controller/video interface 164 provides digital RGB pixel values for display on display 102.

Example Audio System

Audio DSP 156 performs pitch modulation and the mixing of voices and effects data. Audio DSP 156 is augmented by a large quantity (e.g., 16 MB or more) of audio memory 126 (Auxiliary RAM—ARAM) that may be used to store audio-related information such as audio samples. Audio is routed to speakers 61L and 61R via audio codec 122 which includes a digital-to-analog converter. Streaming audio from mass storage device 62 provides an efficient method for reproducing high-fidelity audio during game runtime.

Figure 6A:
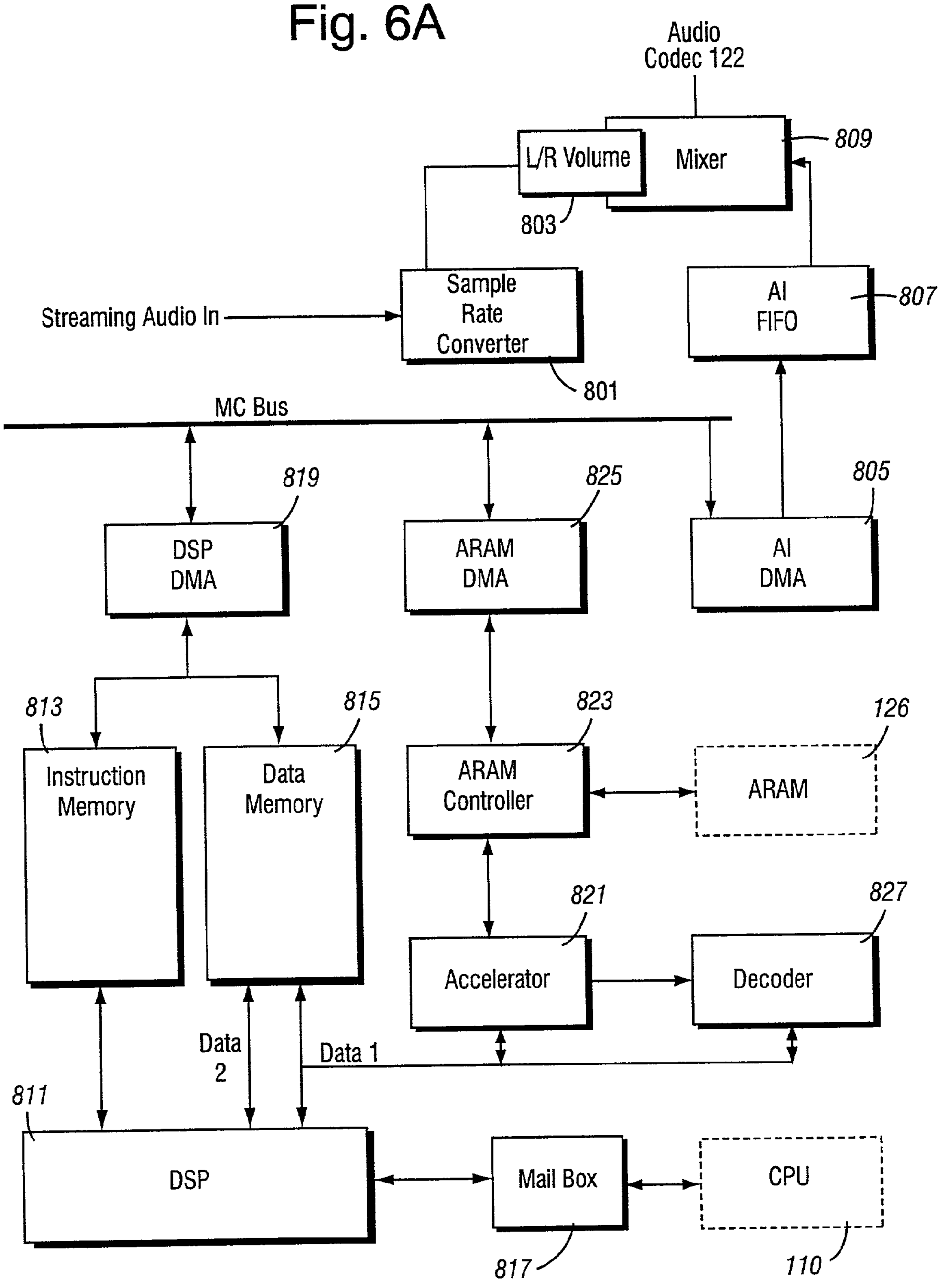
FIG. 6A is a more detailed block diagram of audio DSP 156, audio memory interface 158 and audio interface and mixer 160 shown in FIG. 3.

FIG. 6A is a more detailed block diagram of audio DSP 156, audio memory interface 158 and audio interface and mixer 160 shown in FIG. 3. A sample rate converter 801 samples streaming audio (which may be from mass storage device 62) at either 48 kHz or 32 kHz and L/R volume control 803 controls the left- and right-channel volume levels of the sampled audio. The streaming audio bypasses main memory 112 entirely, thereby conserving memory and processor bandwidth. In cases in which audio data on mass storage device 62 is encoded, for example, in ADPCM format, mass storage access device 106 automatically decodes the ADPCM data into PCM samples (e.g., 16 bits) for supply to sample rate converter 801.

A DMA channel 805 enables the transfer of data from an arbitrary location in main memory 112 to FIFO buffer 807. Mixer 809 mixes the outputs of sample rate converter 801 and FIFO buffer 807 and the result is output to audio codec 122. The sampling rate of audio codec 122 is, for example, 48 kHz and audio codec 122 may be a standard SigmaDelta codec for converting stereo, 16-bit PCM into an analog signal.

DSP core 811 has a 100 MHz instruction clock and uses 16-bit data words and addressing. DSP core 811 uses a word (16-bit) addressable instruction memory 813 that includes a RAM area (e.g., 8 kbyte) and a ROM area (e.g., 8 kbyte) and a word addressable data memory 815 that includes a RAM area (e.g., 8 kbyte) and a ROM area (e.g., 4 kbyte). A DSP DMA 819 is provided to transfer data from/to main memory 112 to/from the DSP data/instruction RAM areas or from the DSP data/instruction ROM areas to main memory 112. There are two requestors of access to instruction memory 813: DSP DMA 819 and DSP 811. The instruction RAM area can be read/write by DSP DMA 819 and can only be read by DSP 811. The instruction ROM area can only be read by DSP 811. There are three requesters of access to data memory 815: DSP DMA 819, data bus 1 and data bus 2. Mail box registers 817 are provided for communication with the main processor 110. Mail box registers 817 may include a first mail box register for communications from main processor 110 to DSP core 811 and a second mail box register for communications from DSP core 811 to main processor 110. Each register is, for example, 32-bits wide. An accelerator 821 is usable instead of DSP core 811 to read from and write to audio memory 126. A memory controller 823 is provided for audio memory 126 and is operative, among other things, to arbitrate requests for audio memory access between DSP core 811 and a dedicated DMA channel 825 controlled by main processor 110 for data transactions between audio memory 126 and main memory 112. Generally, data transactions between audio memory 126 and DSP data memory 815 have priority over DMA channel 825. Additional details of the audio system including details of memory controller 823 and DMA channel 825 may be found in application Ser. No. 09/643,984, now U.S. Pat. No. 6,643,744 entitled "Method and Apparatus for Pre-Fetching Data in Audio Memory", the contents of which are incorporated herein. A decoder 827 decodes audio samples supplied thereto. Audio memory 126 is intended primarily for the storage of audio-related data and may comprise 16 MB of SDRAM (expandable up to a total of 48 MB).

To help reduce audio data storage requirements, various compression and decompression schemes may be utilized. ADCPM refers to adaptive differential PCM. This scheme may be used to compress/decompress sounds generated by the audio system described above and to compress/decompress sounds on mass storage device 62. Various ADPCM algorithms exist and it is not necessary that the same algorithm be used for the sounds generated by the audio system and the sounds on mass storage device 62. Decoder 827 provides runtime ADPCM decompression of sound data generated by the audio system, and mass storage access device 106 provides runtime ADPCM decompression of sound data from mass storage device 62. An 8-bit PCM compression/decompression scheme may also be used for sound data generated by the audio system. Thus, decoder 827 also provides runtime decompression of 8-bit PCM-compressed sound data. Of course, the mentioned compression/decompression schemes are provided by way of illustration, not limitation.

Figure 6B:
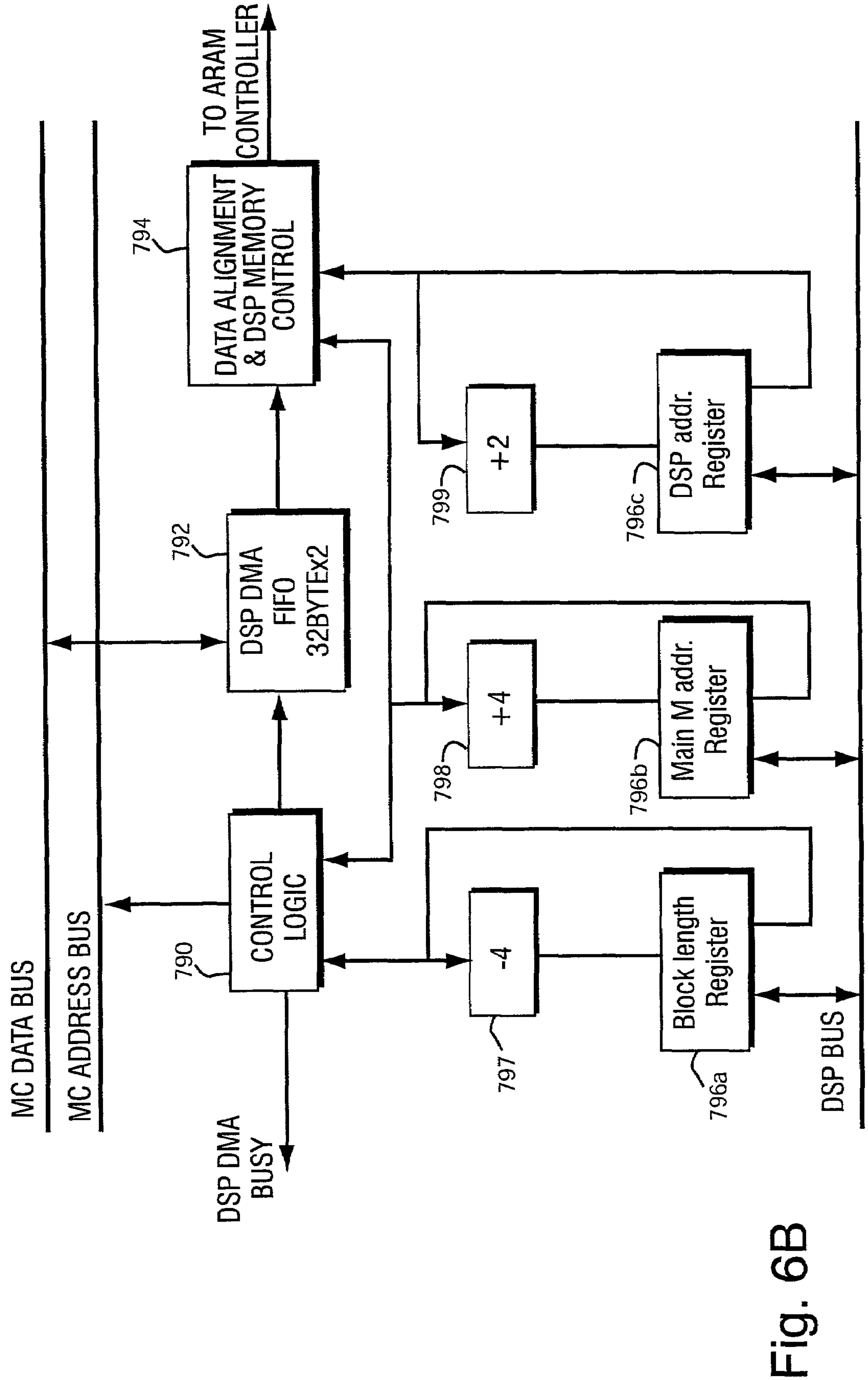
FIG. 6B is a block diagram illustrating the details of DSP DMA 819.

FIG. 6B is a block diagram illustrating the details of DSP DMA 819. As mentioned above, DSP DMA 819 functions to transfer data from/to main memory 112 to/from the DSP data/instruction RAM areas or from the DSP data/instruction ROM areas to main memory 112. DSP DMA 819 includes three registers 796*a*-796*c* that are used to define a block length, a main memory address and a DSP memory address. A 2×32 byte FIFO 792 is used for the data transfer and a 64-bit data bus provides high speed data transfer between FIFO 792 and audio memory 126. The main memory starting address is located at a 4 byte boundary and the DSP starting address is located at a 2 word (32 bit) boundary. The block length is a multiple of 4 bytes. A control register of DSP DMA 819 includes a first bit that specifies the DMA transfer direction and a second bit that specifies whether the data memory or the instruction memory is involved in the DMA transfer. The control register also includes a DSP DMA busy bit for providing DSP DMA status via control logic 790. The busy bit is set once the DSP DMA is enabled and is cleared when the block length in the block length register equals 0.

DSP DMA 819 is enabled by DSP 811 writing to block length register 796*a*. Once DSP DMA 819 is enabled, it requests that memory controller 152 grant access to main memory. When access is granted, data transfer is started. As the data transfers continues, address changing circuits 798 and 799 increase the access address of main memory 112 and DSP memory in registers 796*b* and 796*c*, respectively. The block length in register 796*a* is decreased in accordance with block length changing circuit 797 as the blocks are transferred. The transfer continues until the block length register is 0 and the DMA operation is then stopped. Data alignment and DSP memory control is effected by control circuit 794.

When data is transferred from main memory 112 to DSP memory, if FIFO 792 is full, DSP DMA 819 will wait for FIFO not full and then refill from main memory 112 again. If FIFO 792 is not empty, DMA will transfer data of FIFO to DSP memory until FIFO is empty. When data is transferred from DSP memory to main memory 112, if FIFO 792 is empty, DSP DMA 819 will wait for FIFO not empty and then transfer data of FIFO to main memory 112. If FIFO is not full, DMA will refill FIFO from DSP memory until FIFO is full.

Example DSP DMA relative registers are:

DSMAH: DSp dma Main memory Address High DSPaddress 0xFFCE

| Bits | Name | Type | Reset | Description |
|---|---|---|---|---|
| 15 . . . 10 | 6 bits of its MSBs | R | 0x0 | This register is used to specify DSP DMA main memory starting/current address from bit 31 to bit 26, and always 0 |
| 9 . . . 0 | Main memory address high word | R/W | undefined | This register is used to specify DSP DMA main memory starting/current address from bit 25 to bit 16 |

DSMAL: DSp dma Main memory Address Low DSPaddress 0xFFCF

| Bits | Name | Type | Reset | Description |
|---|---|---|---|---|
| 15 . . . 2 | Main memory address | R/W | undefined | This register is used to specify DSP DMA main memory starting/current address from bit 15 to bit 2 |
| 1, 0 | 2 bits of its LSBs | R | 0x0 | The main memory address of this DMA should be located at 4 byte boundary |

DSPA: DSp dma dsP memory Address High DSPaddress 0xFFCD

| Bits | Name | Type | Reset | Description |
|---|---|---|---|---|
| 15 . . . 1 | DSP memory address | R/W | undefined | This register is used to specify DSP memory starting/ current address from bit 15 to bit 1 |
| 0 | 1 bit of its LSBs | R | 0x0 | The DSP memory address should be located at 2 word boundary |

DSBL: DSp dma Block Length DSPaddress 0xFFCB

| Bits | Name | Type | Reset | Description |
|---|---|---|---|---|
| 15 . . . 2 | block length | R/W | 0x0 | This register is used to specify DSP DMA transfer length from bit 15 to bit 2 |
| 1, 0 | 2 bit of its LSBs | R | 0x0 | The transfer length is a multiple of 4 bytes |

DSCR: DSp dma Control Register DSPaddress 0xFFC9

| Bits | Name | Type | Reset | Description |
|---|---|---|---|---|
| 15 . . . 3 | | R | 0x0 | reserved |
| 2 | DSP DMA busy | R | 0x0 | Block length counter not yet zero, DMA is still busy |
| 1 | DSP source/ destination | R/W | 0x0 | DMA involved DSP memory<br>0: DSP data memory<br>1: DSP instruction memory |
| 0 | transfer direction | R/W | 0x0 | 0: from main memory to DSP memory<br>1: from DSP memory to main memory |

In the example system, the instruction RAM is made of four copies of 256×64-bit synchronous one way dual port SRAM and the instruction ROM is made of two copies of 2048×16-bit synchronous single port ROM. The instruction RAM and the instruction ROM are independent of each other, so while a read/write DMA operation is carried out for the instruction RAM, DSP core 811 can access the instruction ROM. In addition, while DSP DMA 819 writes to the instruction RAM, DSP core 811 can read the instruction RAM. To avoid hardware conflicts, the write and read addresses for the simultaneous read/write should be different.

The data RAM is organized as 4 pages, each page being 1 kword in size. The data ROM is organized as 1 page having a size of 2 kword. One data RAM page is made up of four copies of 256×16-bit synchronous one way dual port SRAM and the data ROM page is made up of a copy of 2048×16-bit synchronous single port ROM. Each page is independent of the other pages so that each page has its own data, address busses and read, write control signals to connect to the three requesters. Data in/out ports for DSP buses 1 and 2 are 16 bits wide and the data in/out ports for DSP DMA 819 are 64 bits. In this arrangement, up to three pages can be active simultaneously for three requesters.

In this example system, each SRAM page can be accessed by one read or one write or one read and one write, but cannot be accessed by two reads or two writes. The reads could be DSP bus 1 or 2 or DSP DMA read and the writes could be DSP bus 1 or 2 or DSP DMA write. The ROM page can only be accessed by one read and the read can be a DSP bus 1 or 2 read. DSP DMA 819 cannot read the data ROM. If a page is being read by DSP DMA, DSP 811 can still write the page or read/write other pages. If a page is being written by DSP DMA 819, DSP 811 can still read the page or read/write other pages. To avoid hardware conflicts, the DSP read and the DMA write or the DSP write and DMA read should not occur on the same address location. DSP 811 is not allowed to read the page that the DMA is reading and the DSP is not allowed to write the page to which the DMA is writing.

Figure 7A:
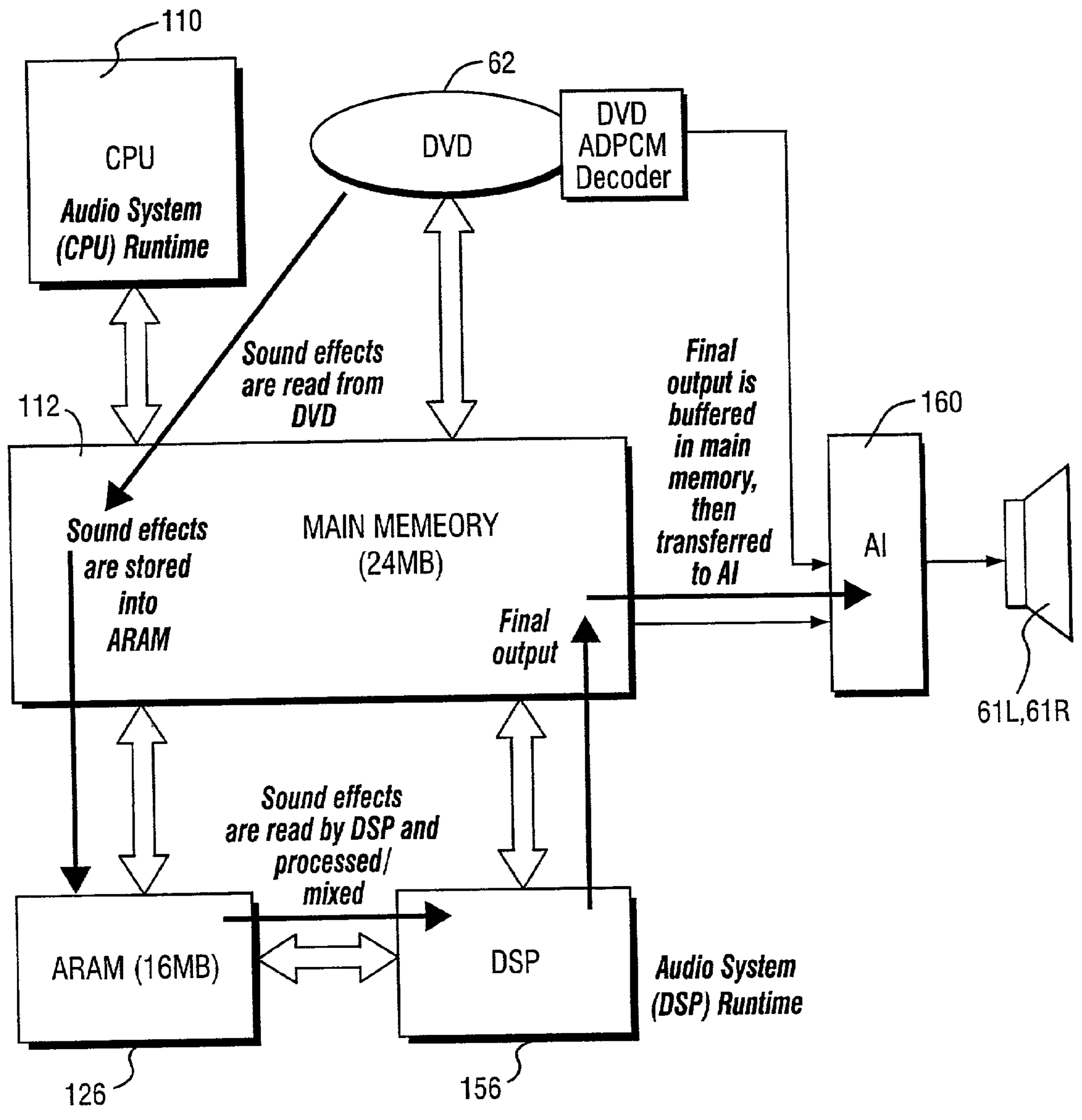
FIGS. 7A and 7B illustrate data flow and control flow, respectively, for reproducing sounds.
Figure 7B:
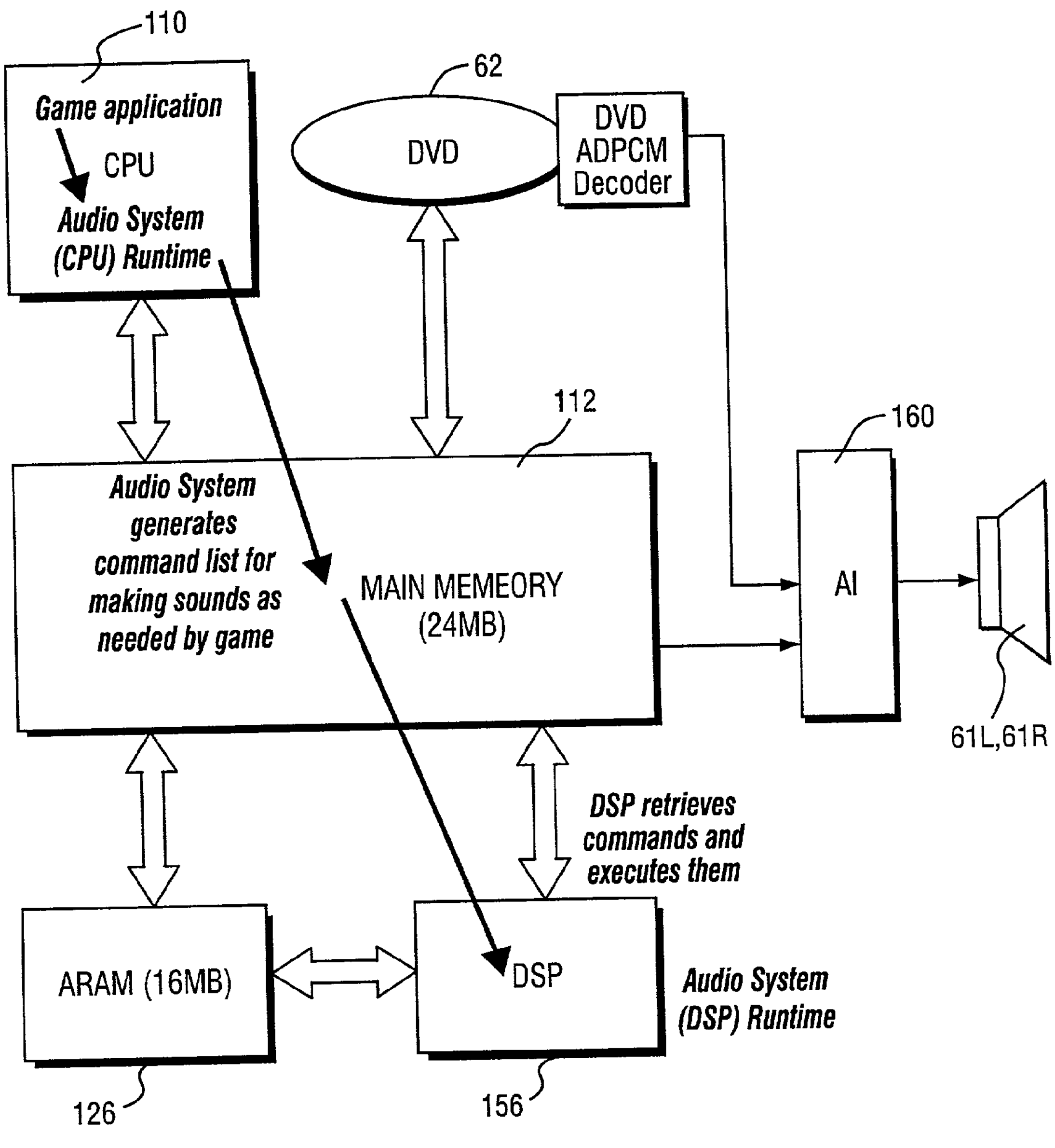

During system initialization, a runtime audio library is downloaded to audio DSP 156. This audio library is used by audio DSP 156 to process and mix voices in accordance with commands in a command list generated by main processor 110. The command list is stored in main memory 112. Audio DSP 156 retrieves the commands from main memory 112 and executes them in accordance with the runtime audio library downloaded thereto. FIGS. 7A and 7B illustrate data flow and control flow, respectively, for reproducing sounds. As shown in FIG. 7A, sound samples are read from mass storage device 62 into main memory 112 via peripheral (I/O) controller 162 and from main memory 112 into audio memory 126 via ARAM DMA 825. The sound samples are read by DSP core 811 via accelerator 821 and DSP core 811 processes/mixes the sound samples. The processed/mixed sound samples are buffered in main memory 112 and then transferred to audio interface FIFO 807 for output to speakers 61L, 61R via audio codec 122. As shown in FIG. 7B, the game application ultimately dictates the need for sound. The game application makes a call to the audio system (main processor) runtime application which generates a command list for audio DSP 156. In executing the command list, audio DSP 156 retrieves the appropriate sound sample and processes it as needed.

The data and control flow for music synthesis is similar to that for sound samples shown in FIG. 7A. The instrument wavetable from mass storage device 62 is stored in audio memory 126 via main memory 112. Audio DSP 156, upon receiving commands generated by the audio system (main processor) run time application, retrieves the necessary instrument samples, processes and mixes them, and stores the result in main memory 112. From there, the result is transferred to audio interface FIFO 807 for output to speakers 61L, 61R via audio codec 122. The commands generated by the audio system (main processor) run time application are driven by the music score which is read from mass storage device 62 into main memory 112 and which is processed and sequenced by the audio system (main processor) run time application according to the demands of the game.

The audio system (main processor) run time application may also manage the playback and mixing of audio tracks to provide software streaming. Software streaming allows the simultaneous playback of one or more audio tracks, which provides a degree of interactivity. The game may, for example, fade from one track into another to influence the player's mood. In general, the different audio tracks are buffered in audio memory 126 as individual sound samples. Audio DSP 156 may then retrieve the tracks and mix them just as it would any other voice.

The audio system described herein permits placing of sound emitters in three-dimensional space. This is achieved with the following features:

Volume and panning control

Pitch modulation (for Doppler effect)

Initial time delay (phase shift between left and right channels)

FIR filter (for HRTF and environmental effects)

Together these features and the main processor-based effects processing described below provide a powerful means of generating psycho-acoustic three-dimensional sound effects with a pair of speakers.

Figure 8:
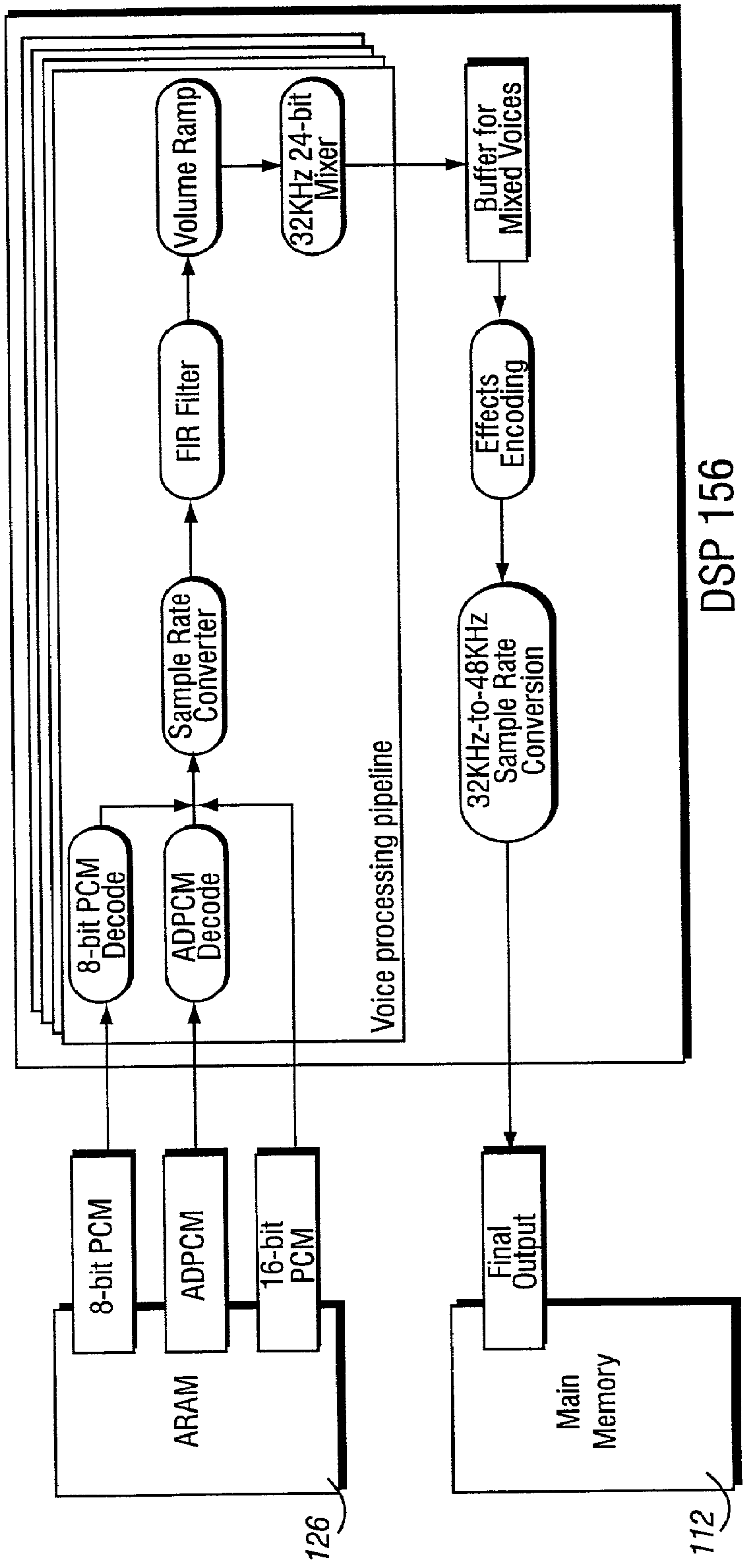
FIG. 8 shows processing steps of DSP 811.

The voice processing pipeline is shown in FIG. 8:

1. Samples are read from audio memory 126 by audio DSP 156.
2. ADPCM and 8-bit PCM samples from audio memory 126 are decoded by decoder 827 and the decoded samples are supplied to a first sample rate converter.
3. 16-bit PCM samples from audio memory 126 are passed directly to the first sample rate converter.
4. The sample rate converter adjusts the pitch of the incoming samples.
5. An FIR filter applies an optional, user-defined filter to the samples.
6. A volume ramp applies a volume ramp across samples for volume envelope articulation.
7. A mixer mixes the samples at a 32 kHz sampling rate with 24-bit precision.

Steps 1-7 are repeated for each voice. When all of the voices have been processed and accumulated in the mixer buffer, the following steps occur:

1. Dolby surround and main processor-based effects (such as reverb or chorus) are applied to the mixed voices.
2. The samples are truncated from 24-bit to 16-bit precision, the data is converted to a 48 kHz sample rate for output by the audio codec 122, and the result is output to main memory 112.

An example mixer with dual effects (auxiliary) busses for applying the host-based effects mentioned above is discussed with reference to FIGS. 9A and 9B. The mixer is symmetrical in the sense that there is the same number of mixer/accumulator channels (i.e., 3—left, right and surround) as effects (auxiliary) sends/returns. Thus the mixer shown in FIG. 9B is a 3×3 symmetrical mixer.

Figure 9A:
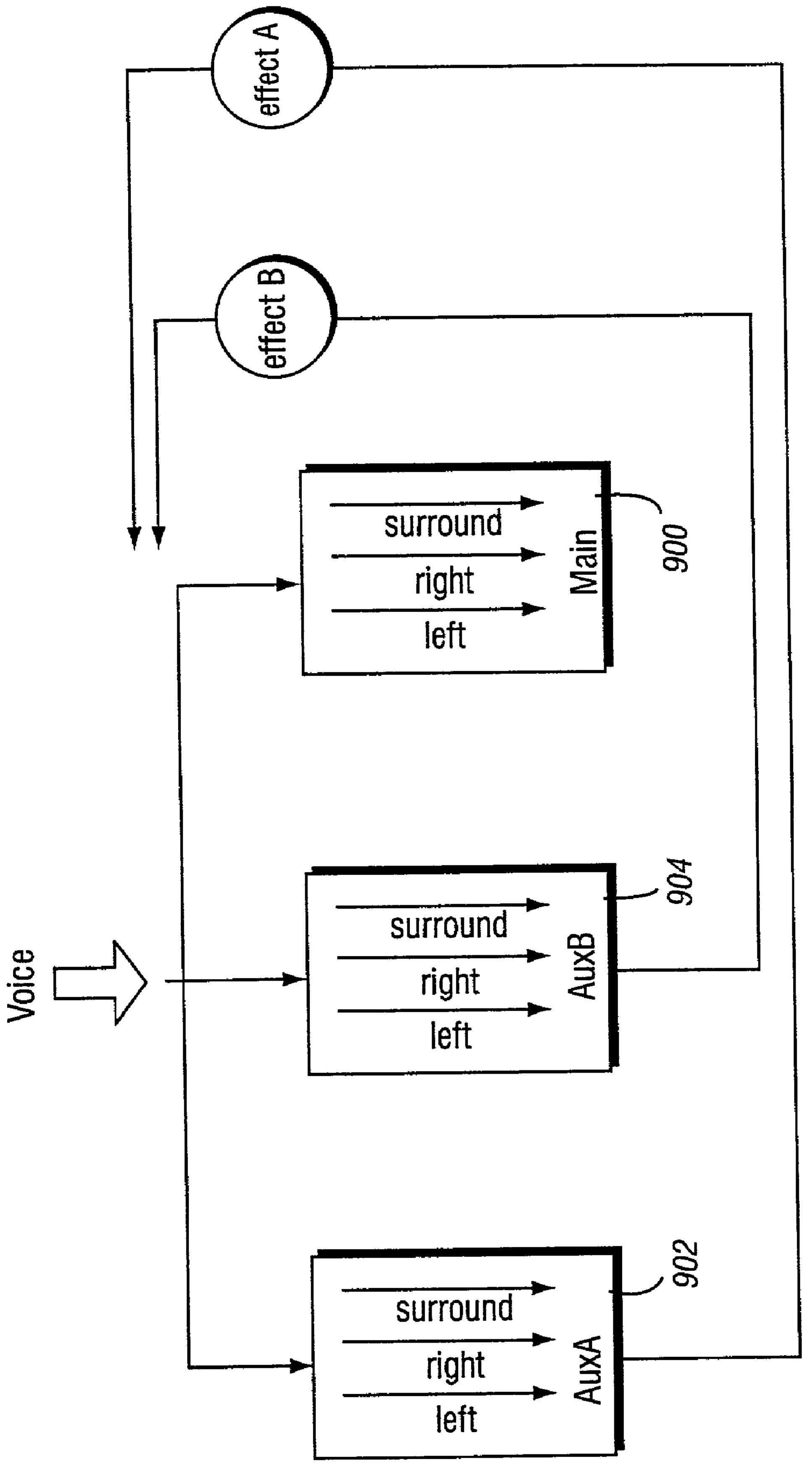
FIG. 9A shows mixer busses and channels.
Figure 9B:
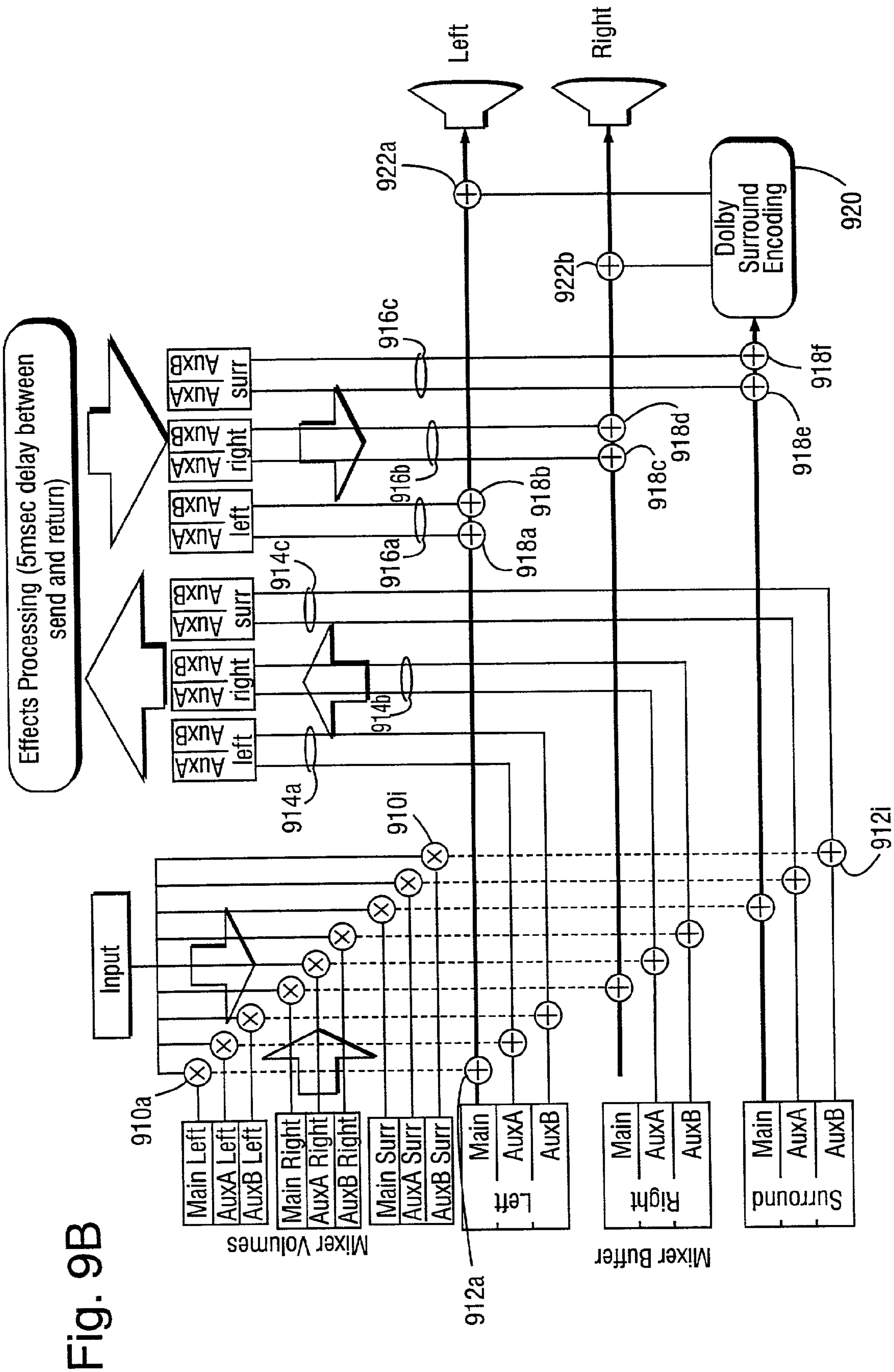
FIG. 9B shows a mixer in accordance with one aspect of the present invention.

With reference to FIG. 9A, the audio system supports three audio busses:

Main bus 900

AuxA bus (first effects bus) 902

AuxB bus (second effects bus) 904

Each of these busses contains three channels:

Left

Right

Surround

The system therefore provides native support for full Dolby Stereo Surround for the main audio bus 900, as well as for the two effects busses (AuxA and AuxB) 902 and 904. The AuxA and AuxB effects busses 902 and 904 distribute audio data to effects processing algorithms which are shown as "Effect A" and "Effect B" in FIG. 9A. These algorithms are executed by main processor 110 and the results thereof are added back to the mixer output. Examples of the effects are reverb, chorus and delay. Detailed explanations of these effects may be found, for example, in a series of articles by Scott Lehman available at www.harmony-central.com/Effects/Articles/Reverb/; www.harmony-central.com/Effects/Articles/Delay/; and www.harmony-central.com/Effects/Articles/Chorus/, the contents of which are incorporated herein. Programmers may of course develop other effects and the invention is not limited in this respect.

FIG. 9B is a more detailed illustration of the example symmetrical 3×3 mixer. Using multipliers 910*a*-910*i*, the mixer first multiplies the input samples against volume values for each channel of each bus. The results are added to the accumulated values stored on the accumulator/mixer busses for the left, right, and surround channels of mixer buffer using adders 912*a*-912*i*. After accumulating all voices in the buffer, the AuxA and AuxB components of the buffer are passed to the effects processing algorithms executed by main processor 110 for effects processing via send paths 914*a*-914*c*. Specifically, the AuxA and AuxB components of the left channel; the AuxA and AuxB components of the right channel; and the AuxA and AuxB components of the surround channel are passed to main memory 112 for effects processing over send paths 914*a*-914*c*, respectively, via DSP DMA 819. The effects processing by main processor 110 is carried out independently for each of the left, right and surround channels based on the signals for each channel. In the example implementation, the effects parameters (e.g., amount of reverb, amount of delay) are the same for each of the channels. What is different for each channel is the amount of accumulated audio signal on which the processing is performed. Of course, the present invention is not limited in this respect and the effects parameters for each channel may be different.

The mixer then retrieves the result of the effects processing from main memory 112 via DSP DMA 819 and distributes it onto the mixer buffer via return paths 916*a*-916*c* and adders 918*a*-918*f*. More specifically, the effects-processed AuxA and AuxB components of the left channel are added to the main component of the left channel via return path 916*a*. Similarly, the effects-processed AuxA and AuxB components of the right channel are added to the main component of the right channel via return path 916*b* and the effects-processed AuxA and AuxB components of the surround channel are added to the main component of the surround channel via return path 916*c*. The above-described "send-and-delayed-return" architecture results in a five-millisecond latency for all effects. If Dolby surround is active, a surround sound encoder 920 encodes the surround channels information into the main left and right channels of the mixer buffer via adders 922*a* and 922*b*.

The mixer and effects processor described above separately provide effects for signals on three or more channels such as left, right and surround channels. Therefore, effects may be selectively "positioned" in three-dimensional space to provide enhanced audio content. The mixer is symmetrical in that the number of effects (auxiliary) sends/returns is the same as the number of mixing/accumulating channels. While the example mixer described above uses three mixing/accumulating channels and three sends/returns, the scope of the invention is not limited in this respect and is readily applicable, for example, to systems having more than three mixing/accumulating channels. Thus, the invention is applicable to any system having channels for three or more of a left channel, a right channel, a surround channel, a left surround channel, a right surround channel, a center channel, a low-frequency effects channel, and the like. Thus, the teachings of the present application are readily applied to systems such as AC3 that utilize six mixing/accumulating channels and would therefore involve six effects (auxiliary) sends/returns.

The audio application dictates the volume levels for each channel. Therefore, the game application may use the AuxA and AuxB busses in pre-fader or post-fader configuration by "pre-multiplying" volume levels as appropriate.

The runtime audio library includes a resource management algorithm that monitors resource usage of audio DSP 156 and dynamically limits voice allocation accordingly. This prevents audio DSP 156 from becoming overburdened, which may result in corrupted audio output. Preferably, the resource management algorithm assumes worst-case memory access latencies to further ensure smooth, continuous audio. For example, up to 64 voices may be supported, depending on the mixing and processing requirement of each voice.

Other Example Compatible Implementations

Certain of the above-described system components 50 could be implemented as other than the home video game console configuration described above. For example, one could run graphics application or other software written for system 50 on a platform with a different configuration that emulates system 50 or is otherwise compatible with it. If the other platform can successfully emulate, simulate and/or provide some or all of the hardware and software resources of system 50, then the other platform will be able to successfully execute the software.

As one example, an emulator may provide a hardware and/or software configuration (platform) that is different from the hardware and/or software configuration (platform) of system 50. The emulator system might include software and/or hardware components that emulate or simulate some or all of hardware and/or software components of the system for which the application software was written. For example, the emulator system could comprise a general-purpose digital computer such as a personal computer, which executes a software emulator program that simulates the hardware and/or firmware of system 50. The DSP processing of the above-described audio system could be emulated on a personal computer.

Some general purpose digital computers (e.g., IBM or MacIntosh personal computers and compatibles) are now equipped with 3D graphics cards that provide 3D graphics pipelines compliant with DirectX or other standard 3D graphics command APIs. They may also be equipped with stereophonic sound cards that provide high quality stereophonic sound based on a standard set of sound commands. Such multimedia-hardware-equipped personal computers running emulator software may have sufficient performance to approximate the graphics and sound performance of system 50. Emulator software controls the hardware resources on the personal computer platform to simulate the processing, 3D graphics, sound, peripheral and other capabilities of the home video game console platform for which the game programmer wrote the game software.

Figure 10A:
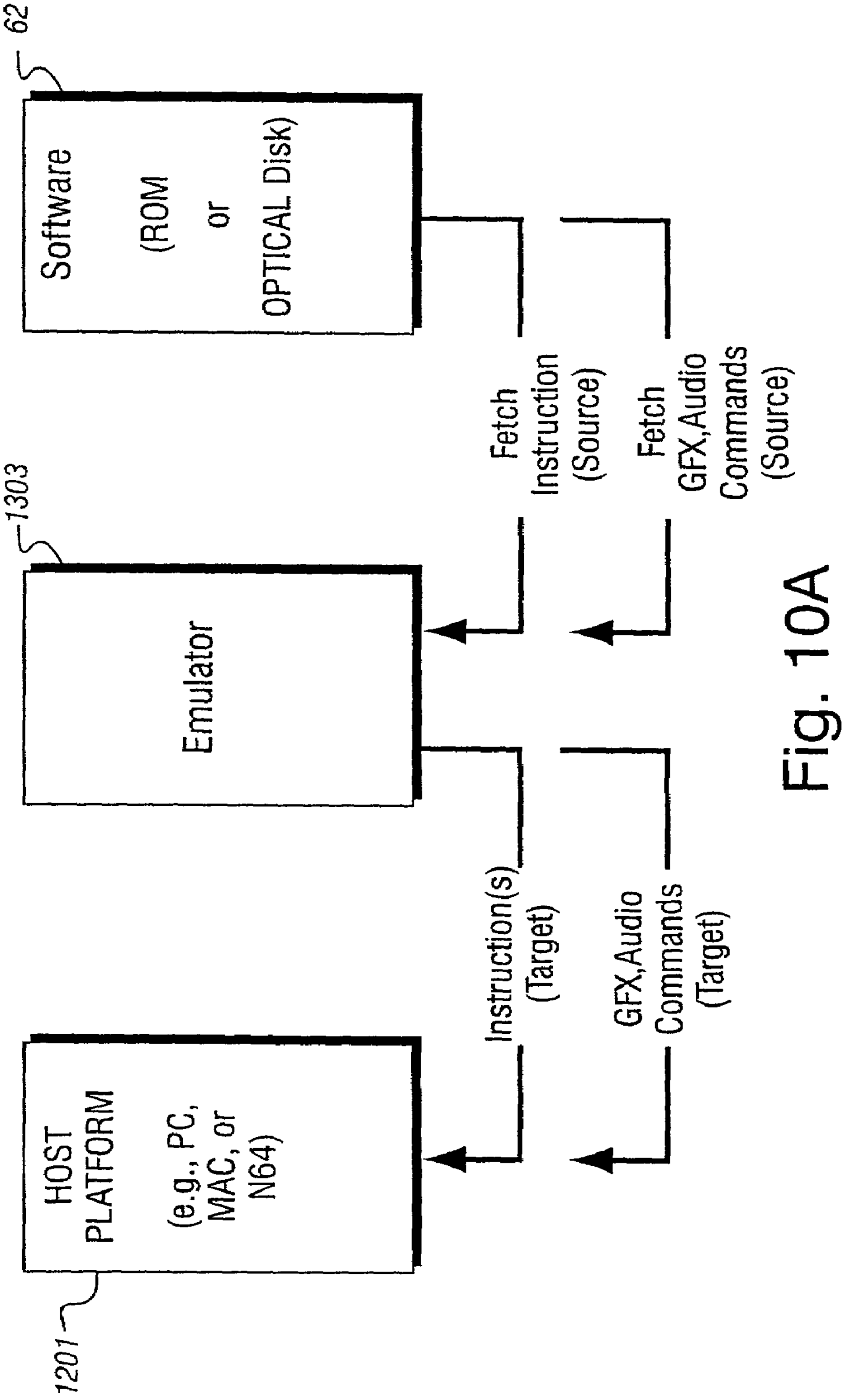
FIGS. 10A and 10B show example alternative compatible implementations.

FIG. 10A illustrates an example overall emulation process using a host platform 1201, an emulator component 1303, and a game software executable binary image provided on a storage medium 62. Host 1201 may be a general or special purpose digital computing device such as, for example, a personal computer, a video game console, or any other platform with sufficient computing power. Emulator 1303 may be software and/or hardware that runs on host platform 1201, and provides a real-time conversion of commands, data and other information from storage medium 62 into a form that can be processed by host 1201. For example, emulator 1303 fetches "source" binary-image program instructions intended for execution by system 50 from storage medium 62 and converts these program instructions to a target format that can be executed or otherwise processed by host 1201.

As one example, in the case where the software is written for execution on a platform using an IBM PowerPC or other specific processor and the host 1201 is a personal computer using a different (e.g., Intel) processor, emulator 1203 fetches one or a sequence of binary-image program instructions from storage medium 1305 and converts these program instructions to one or more equivalent Intel binary-image program instructions. The emulator 1203 also fetches and/or generates graphics commands and audio commands intended for processing by the graphics and audio processor 114, and converts these commands into a format or formats that can be processed by hardware and/or software graphics and audio processing resources available on host 1201. As one example, emulator 1303 may convert these commands into commands that can be processed by specific graphics and/or or sound hardware of the host 1201 (e.g., using standard DirectX, OpenGL and/or sound APIs).

An emulator 1303 used to provide some or all of the features of the video game system described above may also be provided with a graphic user interface (GUI) that simplifies or automates the selection of various options and screen modes for games run using the emulator. In one example, such an emulator 1303 may further include enhanced functionality as compared with the host platform for which the software was originally intended.

Figure 10B:
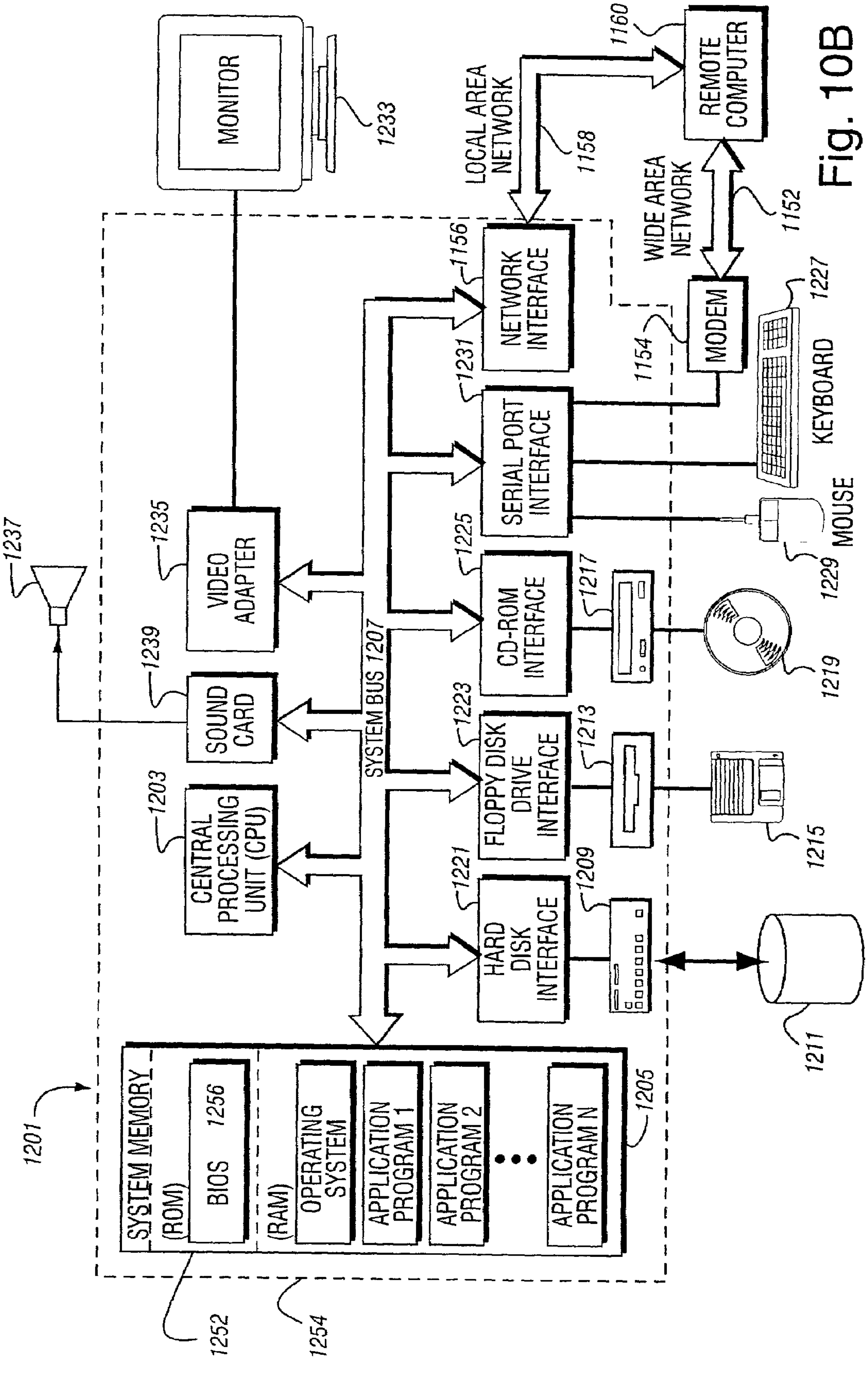
Figure 11A:
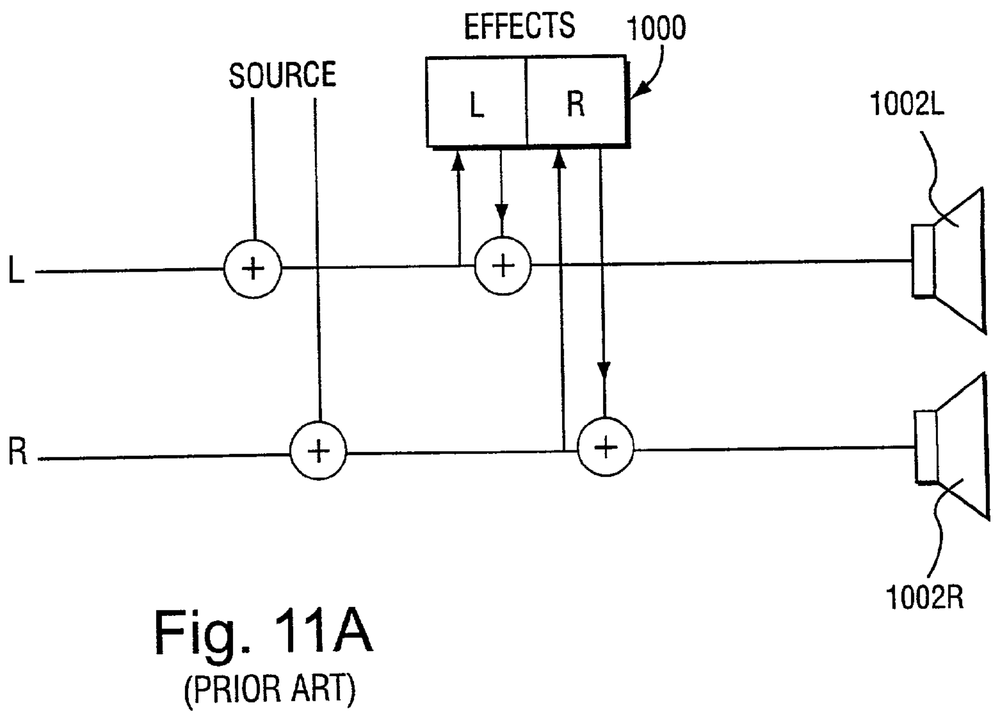
Fig. 11A (PRIOR ART)
FIG. 11A shows a conventional arrangement for providing sound effects in a stereo sound system.
Figure 11B:
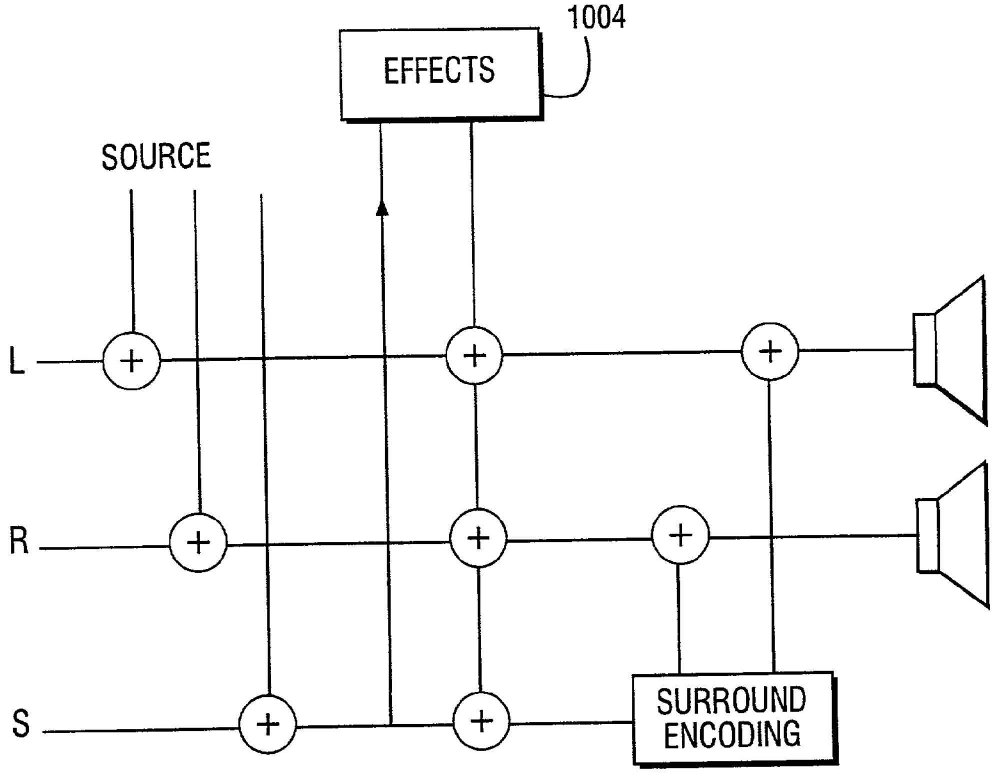
Fig. 11B (PRIOR ART)
FIG. 11B shows a conventional arrangement for providing sound effects in a surround sound system.

FIG. 10B illustrates an emulation host system 1201 suitable for use with emulator 1303. System 1201 includes a processing unit 1203 and a system memory 1205. A system bus 1207 couples various system components including system memory 1205 to processing unit 1203. System bus 1207 may be any of several types of bus structures including a memory bus or memory controller, a peripheral bus, and a local bus using any of a variety of bus architectures. System memory 1207 includes read only memory (ROM) 1252 and random access memory (RAM) 1254. A basic input/output system (BIOS) 1256, containing the basic routines that help to transfer information between elements within personal computer system 1201, such as during start-up, is stored in the ROM 1252. System 1201 further includes various drives and associated computer-readable media. A hard disk drive 1209 reads from and writes to a (typically fixed) magnetic hard disk 1211. An additional (possible optional) magnetic disk drive 1213 reads from and writes to a removable "floppy" or other magnetic disk 1215. An optical disk drive 1217 reads from and, in some configurations, writes to a removable optical disk 1219 such as a CD ROM or other optical media. Hard disk drive 1209 and optical disk drive 1217 are connected to system bus 1207 by a hard disk drive interface 1221 and an optical drive interface 1225, respectively. The drives and their associated computer-readable media provide nonvolatile storage of computer-readable instructions, data structures, program modules, game programs and other data for personal computer system 1201. In other configurations, other types of computer-readable media that can store data that is accessible by a computer (e.g., magnetic cassettes, flash memory cards, digital video disks, Bernoulli cartridges, random access memories (RAMs), read only memories (ROMs) and the like) may also be used.

A number of program modules including emulator 1303 may be stored on the hard disk 1211, removable magnetic disk 1215, optical disk 1219 and/or the ROM 1252 and/or the RAM 1254 of system memory 1205. Such program modules may include an operating system providing graphics and sound APIs, one or more application programs, other program modules, program data and game data. A user may enter commands and information into personal computer system 1201 through input devices such as a keyboard 1227, pointing device 1229, microphones, joysticks, game controllers, satellite dishes, scanners, or the like. These and other input devices can be connected to processing unit 1203 through a serial port interface 1231 that is coupled to system bus 1207, but may be connected by other interfaces, such as a parallel port, game port Fire wire bus or a universal serial bus (USB). A monitor 1233 or other type of display device is also connected to system bus 1207 via an interface, such as a video adapter 1235.

System 1201 may also include a modem 1154 or other network interface means for establishing communications over a network 1152 such as the Internet. Modem 1154, which may be internal or external, is connected to system bus 123 via serial port interface 1231. A network interface 1156 may also be provided for allowing system 1201 to communicate with a remote computing device 1150 (e.g., another system 1201) via a local area network 1158 (or such communication may be via wide area network 1152 or other communications path such as dial-up or other communications means). System 1201 will typically include other peripheral output devices, such as printers and other standard peripheral devices.

In one example, video adapter 1235 may include a 3D graphics pipeline chip set providing fast 3D graphics rendering in response to 3D graphics commands issued based on a standard 3D graphics application programmer interface such as Microsoft's DirectX 7.0 or other version. A set of stereo loudspeakers 1237 is also connected to system bus 1207 via a sound generating interface such as a conventional "sound card" providing hardware and embedded software support for generating high quality stereophonic sound based on sound commands provided by bus 1207. These hardware capabilities allow system 1201 to provide sufficient graphics and sound speed performance to play software stored in storage medium 1305.

An emulator 1303 used to provide some or all of the features of the video game system described above may also be provided with a graphic user interface (GUI) that simplifies or automates the selection of various options and screen modes for games run using the emulator. In one example, such an emulator 1303 may further include enhanced functionality as compared with the host platform for which the software was originally intended.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the scope of the appended claims.

We claim:

1. A mixer for mixing sound signals, comprising:

a mixer buffer for storing sample values for three or more sound channels including at least a left sound channel, a right sound channel and a surround sound channel, each sound channel including a main sound component and one or more corresponding auxiliary sound components;

send paths for sending the auxiliary sound components for each sound channel to a sound effects processor; and return paths from the sound effects processor for separately adding the effects-processed auxiliary sound components for each of the three or more sound channels to the respective corresponding main sound component.

2. The mixer according to claim 1, further comprising:

mixer volume controls for independently controlling the volume of the main and auxiliary sound components of each sound channel supplied to the mixer buffer.

3. The mixer according to claim 1, further comprising:

a surround encoder, wherein the surround encoder encodes information on the surround sound channel, including the effects-processed auxiliary sound components added to the surround channel, onto the left and right sound channels.

4. The mixer according to claim 1, wherein the sample values for three or more sound channels are accumulated for a plurality of voices.

5. A sound effects processing system comprising:

a sound effects processor; and a mixer comprising:

a mixer buffer for storing sample values for three or more sound channels including at least a left sound channel, a right sound channel and a surround sound channel, each sound channel including a main sound component and one or more corresponding auxiliary sound components;

send paths for sending the auxiliary sound components for each sound channel to the sound effects processor; and return paths from the sound effects processor for separately adding the effects-processed auxiliary sound components for each of the three or more sound channels to the respective corresponding main sound component.

6. The system according to claim 5, wherein the mixer further comprises:

mixer volume controls for independently controlling the volume of the main and auxiliary sound components of each sound channel supplied to the mixer buffer.

7. The system according to claim 5, wherein the mixer further comprises a surround encoder, and the surround encoder encodes information on the surround sound channel, including the effects-processed auxiliary sound components added to the surround channel, onto the left and right sound channels.

8. The system according to claim 5, wherein the sample values for three or more sound channels are accumulated for a plurality of voices.

9. The system according to claim 5, wherein the sound effects processor provides reverb to the auxiliary sound components for each sound channel.

10. The system according to claim 5, wherein the sound effects processor provides delay to the auxiliary sound components for each sound channel.

11. The system according to claim 5, wherein the sound effects processor provides chorus to the auxiliary sound components for each sound channel.

12. The system according to claim 5, wherein the sound effects processor processes the auxiliary sound components for each sound channel using the same sound effects parameters.

13. The system according to claim 5, wherein the sound effects processor processes the auxiliary sound components for each sound channel using different sound effects parameters.

14. A video game system comprising:

a video game machine for executing a video game program; and a hand-held player controller connected to said video game machine and operable by a player to generate video game control signals for the video game program, wherein said video game machine includes an audio system for generating sound signals for driving speakers, said audio system comprising:

a sound effects processor; and a mixer comprising:

a mixer buffer for storing sample values for three or more sound channels including at least a left sound channel, a right sound channel and a surround sound channel, each sound channel including a main sound component and one or more corresponding auxiliary sound components;

send paths for sending the auxiliary sound components for each sound channel to the sound effects processor; and return paths from the sound effects processor for separately adding the effects-processed auxiliary sound components for each of the three or more sound channels to the respective corresponding main sound component.

15. The system according to claim 14, wherein the mixer further comprises:

mixer volume controls for independently controlling the volume of the main and auxiliary sound components of each sound channel supplied to the mixer buffer.

16. The system according to claim 14, wherein the mixer further comprises a surround encoder, and the surround encoder encodes information on the surround sound channel, including the effects-processed auxiliary sound components added to the surround channel, onto the left and right sound channels.

17. The system according to claim 14, wherein the sample values for three or more sound channels are accumulated for a plurality of voices.

18. The system according to claim 14, wherein the sound effects processor provides reverb to the auxiliary sound components for each sound channel.

19. The system according to claim 14, wherein the sound effects processor provides delay to the auxiliary sound components for each sound channel.

20. The system according to claim 14, wherein the sound effects processor provides chorus to the auxiliary sound components for each sound channel.

21. The system according to claim 14, wherein the sound effects processor processes the auxiliary sound components for each sound channel using the same sound effects parameters.

22. The system according to claim 14, wherein the sound effects processor processes the auxiliary sound components for each sound channel using different sound effects parameters.

23. In an audio system, a method of mixing sound signals, comprising:

storing sample values for three or more sound channels including at least a left sound channel, a right sound channel and a surround sound channel, each sound channel including a main sound component and one or more corresponding auxiliary sound components;

sending the auxiliary sound components for each sound channel to a sound effects processor; and separately adding the effects-processed auxiliary sound components for each of the three or more sound channels to the respective corresponding main sound component.

24. The method according to claim 23, further comprising:

independently controlling the volume of the main and auxiliary sound components of each sound channel.

25. The method according to claim 23, wherein information on the surround sound channel, including the effects-processed auxiliary sound components added to the surround channel, is encoded onto the left and right sound channels.

26. The method according to claim 23, wherein the sample values for three or more sound channels are accumulated for a plurality of voices.

27. The method according to claim 23, wherein the sound effects processor provides reverb to the auxiliary sound components for each sound channel.

28. The method according to claim 23, wherein the sound effects processor provides delay to the auxiliary sound components for each sound channel.

29. The method according to claim 23, wherein the sound effects processor provides chorus to the auxiliary sound components for each sound channel.

* * * * *